United States Patent
Li et al.

(10) Patent No.: US 12,309,622 B2
(45) Date of Patent: May 20, 2025

(54) BEAM FAILURE PROCESSING METHOD AND APPARATUS

(71) Applicant: HUAWEI TECHNOLOGIES CO., LTD., Shenzhen (CN)

(72) Inventors: Tie Li, Beijing (CN); Yongping Zhang, Beijing (CN); Xi Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 520 days.

(21) Appl. No.: 17/587,371

(22) Filed: Jan. 28, 2022

(65) Prior Publication Data

US 2022/0150731 A1    May 12, 2022

Related U.S. Application Data

(63) Continuation of application No. PCT/CN2020/096166, filed on Jun. 15, 2020.

(30) Foreign Application Priority Data

Jul. 30, 2019  (CN) .......................... 201910696132.5

(51) Int. Cl.
*H04W 24/04*    (2009.01)

(52) U.S. Cl.
CPC ................................. *H04W 24/04* (2013.01)

(58) Field of Classification Search
CPC ..................................................... H04W 24/04
See application file for complete search history.

(56) References Cited

U.S. PATENT DOCUMENTS

| | | | |
|---|---|---|---|
| 2011/0194455 A1 | 8/2011 | Aminaka et al. | |
| 2019/0245737 A1* | 8/2019 | Zhou | H04B 7/06 |
| 2020/0137821 A1* | 4/2020 | Cirik | H04W 76/19 |
| 2020/0145083 A1* | 5/2020 | John Wilson | H04B 7/0695 |

(Continued)

FOREIGN PATENT DOCUMENTS

| | | |
|---|---|---|
| CN | 105101253 A | 11/2015 |
| CN | 107534928 A | 1/2018 |
| CN | 109246732 A | 1/2019 |

(Continued)

OTHER PUBLICATIONS

Oppo et al.,"MAC impacts on supporting BFR procedure on SCell",3GPP TSG-RAN2 Meeting #102,Busan, Korea, May 21-25, 2018,R2-1807415,total:5pages.

(Continued)

*Primary Examiner* — Duc C Ho
(74) *Attorney, Agent, or Firm* — HAUPTMAN HAM, LLP

(57) ABSTRACT

A beam failure processing method includes determining a beam failure of a first cell. A beam failure recovery procedure of a primary cell in the first cell and a second cell is performed before beam failure recovery of the first cell succeeds and if a beam failure of the second cell is determined. The first cell is the primary cell and the second cell is a secondary cell, or the first cell is the secondary cell and the second cell is the primary cell. The method also includes sending information to a network device. The information is used to indicate at least a beam failure of the primary cell in the first cell and the second cell.

18 Claims, 7 Drawing Sheets

(56) References Cited

U.S. PATENT DOCUMENTS

2021/0013951 A1* 1/2021 Chen .................... H04W 48/20

FOREIGN PATENT DOCUMENTS

| CN | 109314875 A | 2/2019 |
|---|---|---|
| CN | 110034799 A | 7/2019 |
| WO | 2019027294 A1 | 2/2019 |
| WO | 2019032882 A1 | 2/2019 |
| WO | 2019135654 A1 | 7/2019 |

OTHER PUBLICATIONS

Extended European Search Report issued in corresponding European Application No. 20847363.7, dated Jul. 19, 2022, pp. 1-7.

R1-1907533, Huawei et al, Beam failure recovery for SCell with new beam information, 3GPP Tsg Ran WG1 Meeting #97, Reno, USA, May 13-17, 2019, total 7 pages.

Tdoc R1-1907436, Ericsson, Enhancements to multi-beam operation, 3GPP TSG-RAN WG1 Meeting #97, Reno, USA, May 13-17, 2019, total 17 pages.

3GPP TS 38.133 V15.6.0 (Jun. 2019), 3rd Generation Partnership Project;Technical Specification Group Radio Access Network; NR;Requirements for support of radio resource management(Release 15), total 1002 pages.

3GPP TS 38.213 V15.6.0 (Jun. 2019), 3rd Generation Partnership Project;Technical Specification Group Radio Access Network;NR;Physical layer procedures for control(Release 15), total 107 pages.

International Search Report issued in corresponding International Application No. PCT/CN2020/096166, dated Jul. 29, 2020, pp. 1-9.

Chinese Notice of Allowance issued in corresponding Chinese Application No. 201910696132.5, dated Sep. 8, 2021, pp. 1-4.

* cited by examiner

BEAM FAILURE PROCESSING METHOD AND APPARATUS

CROSS-REFERENCE TO RELATED APPLICATIONS

This application is a continuation of International Application No. PCT/CN2020/096166, filed on Jun. 15, 2020, which claims priority to Chinese Patent Application No. 201910696132.5, filed on Jul. 30, 2019. The disclosures of the aforementioned applications are hereby incorporated by reference in their entireties.

TECHNICAL FIELD

This application relates to the field of communications technologies, and in particular, to a beam failure processing method and apparatus.

BACKGROUND

To provide a higher transmission rate for a terminal, a carrier aggregation (carrier aggregation, CA) technology is introduced into an existing wireless communication system. The CA technology means that a plurality of carriers are allocated to a terminal at the same time, so that the terminal device can simultaneously perform data transmission on the plurality of carriers, to improve a data transmission rate. The plurality of carriers usually include one primary component carrier and one or more secondary component carriers. A cell operating on the primary carrier is a primary cell (primary cell, PCell). The PCell is a cell initially accessed by the terminal device, and a base station in which the PCell is located is responsible for performing radio resource control (radio resource control, RRC) communication with the terminal device. A cell operating on the secondary component carrier is a secondary cell (secondary cell, SCell). The SCell may provide an additional radio resource for the terminal device.

An operating frequency band supported by a future communication system is increased to a high frequency band above 6 GHz. During high frequency band communication, because a wavelength of a wireless signal is relatively short, signal propagation is easily blocked, resulting in a relatively large signal propagation loss. Therefore, a beamforming (beamforming, BF) technology is used in a 5G system to obtain a beam having good directionality, to increase antenna gains and improve a signal to interference plus noise ratio (signal to interference plus noise ratio, SINR) of a receive end. Currently, before communicating with the terminal device by using a beam, the base station uses a beam sweeping (beam sweeping) process to determine a beam pair (a transmit beam and a receive beam) used when a network device communicates with the terminal device.

However, when a block (for example, a human body, a vehicle, or a building) appears in a transmission process of the radio signal, misalignment may occur between beams originally aligned with each other. As a result, link quality rapidly deteriorates or is interrupted, and the terminal device enters a radio link failure (radio link failure, RLF) state. Therefore, when measuring that a quality of a current beam is poor, the terminal device needs to initiate a beam failure recovery process. Specifically, the terminal device may receive, in a receive beam configured by the base station, a plurality of beam failure detection reference signals (beam failure detection reference signals, BFD RSs) from the base station, and determine, based on signal quality of the plurality of received beam failure detection reference signals, whether a beam failure trigger condition is met. Once the beam failure trigger condition is met, the terminal device may determine that the receive beam is not suitable for communication, and may send a beam failure recovery request (beam failure recovery request, BFRQ) to the base station. After receiving the beam failure recovery request, the base station may reconfigure a receive beam and/or a transmit beam for the terminal device by using higher layer signaling.

Currently, only the foregoing specific beam failure recovery process is proposed. However, in a scenario related to a plurality of cells, there is no solution to how to perform beam recovery when beam failures occur in both a primary cell and a secondary cell, and this is an urgent problem to be resolved.

SUMMARY

Embodiments of this application provide a beam failure processing method and apparatus, to resolve a problem of how to perform beam recovery when beam failures occur in both a primary cell and a secondary cell.

According to a first aspect, embodiments of this application provide a beam failure processing method, including: determining a beam failure of a first cell, and suspending or terminating a beam failure recovery procedure of a secondary cell in the first cell and a second cell before beam failure recovery of the first cell succeeds and if a beam failure of the second cell is determined; and after determining that beam failure recovery of a primary cell in the first cell and the second cell succeeds, sending first information to a network device, where the first information is used to indicate a beam failure of the secondary cell in the first cell and the second cell. The first cell is the primary cell and the second cell is the secondary cell, or the first cell is the secondary cell and the second cell is the primary cell.

It can be learned from the foregoing process that when beam failures occur in both the primary cell and the secondary cell, a beam of the primary cell may be first recovered, and then a beam of the secondary cell may be recovered. This can ensure that communication of the primary cell is preferentially recovered to be normal, thereby minimizing impact caused by beam failures of a plurality of cells.

In a possible implementation, the suspending or terminating a beam failure recovery procedure of a secondary cell in the first cell and the second cell includes one or more of the following:

suspending or terminating a beam failure detection timer of the secondary cell, and resetting the timer;
suspending or terminating a beam failure detection counter of the secondary cell, and resetting the counter; and
skipping sending beam failure recovery request information of the secondary cell to the network device.

According to the foregoing method, the beam failure recovery procedure of the secondary cell is suspended or terminated, so that power consumption of the terminal device can be reduced, and a battery life of the terminal device can be improved.

In a possible implementation, the method further includes: receiving second information from the network device, where the second information is used to indicate a first beam, and the first beam is used to receive, in the secondary cell, downlink information from the network device.

In a possible implementation, the receiving second information from the network device includes: receiving, in the primary cell, the second information from the network device; or receiving, in a third cell, the second information from the network device, where the third cell is a secondary cell in which no beam failure occurs.

In the foregoing method, the second information is obtained through the primary cell or the third cell, so that a latency of recovering the beam of the secondary cell can be reduced, and system efficiency can be improved.

In a possible implementation, the first information is sent by using a first resource. The method further includes: if downlink information from the network device is successfully received in the secondary cell by using a first beam, determining that the first beam is a new available beam in the secondary cell, where the first beam is a beam associated with the first resource.

In the foregoing method, an association relationship between the first beam and the first resource is established, so that the first beam may not need to be indicated by using signaling, thereby reducing signaling overheads.

According to a second aspect. An embodiment of this application provides a beam failure processing method, including: after receiving first information from a terminal device, recovering a beam of the terminal device in a secondary cell based on the first information. The first information is used to indicate a beam failure of a secondary cell in a first cell and a second cell. The first information is sent by the terminal device after the terminal device determines that beam failure recovery of a primary cell in the first cell and the second cell succeeds. The first cell is the primary cell and the second cell is the secondary cell, or the first cell is the secondary cell and the second cell is the primary cell.

It can be learned from the foregoing process that when beam failures occur in both the primary cell and the secondary cell, a beam of the primary cell may be first recovered, and then a beam of the secondary cell may be recovered. This can ensure that communication of the primary cell is preferentially recovered to be normal, thereby minimizing impact caused by beam failures of a plurality of cells.

In a possible implementation, the method further includes: sending second information to the terminal device, where the second information is used to indicate a first beam, and the first beam is used by the terminal device to receive downlink information in the secondary cell.

In a possible implementation, the sending second information to the terminal device includes: sending the second information in the primary cell; or sending the second information in a third cell, where the third cell is a secondary cell in which no beam failure occurs.

In a possible implementation, the first information is sent by using a first resource. The method further includes: determining a first beam associated with the first resource, and sending downlink information to the terminal device in the secondary cell by using the first beam.

In the foregoing method, an association relationship between the first beam and the first resource is established, so that the first beam may not need to be indicated by using signaling, thereby reducing signaling overheads.

According to a third aspect, an embodiment of this application provides a beam failure processing method, including: determining a beam failure of a first cell, suspending or terminating a beam failure recovery procedure of the first cell before beam failure recovery of the first cell succeeds and if a beam failure of a second cell is determined, and sending third information to a network device, where the third information is used to indicate at least a beam failure of a primary cell in the first cell and the second cell; the first cell is the primary cell and the second cell is a secondary cell, or the first cell is a secondary cell and the second cell is the primary cell; and receiving fourth information from the network device, where the fourth information is used to respond to the third information.

It can be learned from the foregoing process that when beam failures occur in both the primary cell and the secondary cell, at least a beam of the primary cell may be first recovered. This can ensure that communication of the primary cell is preferentially recovered to be normal, thereby minimizing impact caused by beam failures of a plurality of cells.

In a possible implementation, the third information is used to indicate the beam failure of the first cell, and is used to indicate the beam failure of the second cell. The sending third information to a network device includes: sending the third information to the network device by using a second resource, where the second resource is a random access resource, a scheduling request resource, an uplink control resource, an uplink data resource, a media access control control element resource, or a dedicated beam recovery request resource.

It can be learned from the foregoing process that when beam failures occur in both the primary cell and the secondary cell, the primary cell and the secondary cell may be recovered at the same time, thereby reducing a latency caused by beam failure recovery, and improving system efficiency.

In a possible implementation, the method further includes: receiving fifth information from the network device, where the fifth information is used to indicate a second beam, and the second beam is used to receive, in the secondary cell, downlink information from the network device.

In a possible implementation, the receiving fifth information from the network device includes: receiving, in the primary cell, the fifth information from the network device; or receiving, in a third cell, the fifth information from the network device, where the third cell is a secondary cell in which no beam failure occurs.

In a possible implementation, the third information is sent by using the second resource. The method further includes: if downlink information from the network device is successfully received in the secondary cell by using a second beam, determining that the second beam is a new available beam in the secondary cell, where the second beam is a beam associated with the second resource.

In the foregoing method, an association relationship between the second beam and the second resource is established, so that a second beam may not need to be indicated by using signaling, thereby reducing signaling overheads.

According to a fourth aspect, an embodiment of this application provides a beam failure processing method, including: receiving third information from a terminal device, where the third information is used to indicate at least a beam failure of a primary cell in a first cell and a second cell; the first cell is the primary cell and the second cell is a secondary cell, or the first cell is a secondary cell and the second cell is the primary cell; the third information is sent by the terminal device before beam failure recovery of the first cell succeeds and after a beam failure of the second cell is determined, or is sent by the terminal device before beam failure request information of the first cell is successfully sent and after a beam failure of the second cell is determined; and sending fourth information to the terminal device, where the fourth information is used to respond to the third information.

It can be learned from the foregoing process that when beam failures occur in both the primary cell and the secondary cell, at least a beam of the primary cell may be first recovered. This can ensure that communication of the primary cell is preferentially recovered to be normal, thereby minimizing impact caused by beam failures of a plurality of cells.

In a possible implementation, the method further includes: sending fifth information to the terminal device, where the fifth information is used to indicate a second beam, and the second beam is used by the terminal device to receive downlink information in the secondary cell.

In a possible implementation, the sending fifth information to the terminal device includes: sending the fifth information in the primary cell; or sending the fifth information in a third cell, where the third cell is a secondary cell in which no beam failure occurs.

In a possible implementation, the third information is sent by using a second resource. The method further includes: determining a second beam associated with the second resource, and sending downlink information to the terminal device in the secondary cell by using the second beam.

In the foregoing method, an association relationship between the second beam and the second resource is established, so that a first beam may not need to be indicated by using signaling, thereby reducing signaling overheads.

According to a fifth aspect, an embodiment of this application provides a beam failure processing method, including: determining a beam failure of a first cell, and sending sixth information to a network device before beam failure recovery of the first cell succeeds and if a beam failure of a second cell is determined, where the sixth information is used to indicate at least a beam failure of a primary cell in the first cell and the second cell; the first cell is the primary cell and the second cell is a secondary cell, or the first cell is a secondary cell and the second cell is the primary cell; and receiving seventh information from the network device, where the seventh information is used to respond to the sixth information.

It can be learned from the foregoing process that when beam failures occur in both the primary cell and the secondary cell, a beam of at least the primary cell may be recovered. This can ensure that communication of the primary cell is preferentially recovered to be normal, thereby minimizing impact caused by beam failures of a plurality of cells.

In a possible implementation, before the sending sixth information to a network device, the method further includes: The terminal device suspends or terminates a beam failure recovery procedure of the secondary cell in the first cell and the second cell.

In a possible implementation, when the sixth information is used to indicate the beam failure of the primary cell, the sending sixth information to a network device includes: selecting a beam from a preset candidate beam set as a first beam; and sending, by using the first beam, the sixth information to the network device in a random access resource associated with the first beam.

In a possible implementation, the method further includes: sending eighth information to the network device, where the eighth information is used to indicate a beam failure of the secondary cell.

In a possible implementation, the sixth information is used to indicate the beam failure of the first cell, and is used to indicate the beam failure of the second cell. The sending sixth information to a network device includes: sending the sixth information to the network device by using a third resource, where the third resource is a random access resource, a scheduling request resource, an uplink control resource, an uplink data resource, a media access control control element resource, or a dedicated beam recovery request resource.

In a possible implementation, the method further includes: receiving ninth information from the network device, where the ninth information is used to indicate a fifth beam, and the fifth beam is used to receive, in the secondary cell, downlink information from the network device.

In the foregoing method, the ninth information is obtained through the primary cell or a third cell, so that a latency of recovering a beam of the secondary cell can be reduced, and system efficiency can be improved.

In a possible implementation, the receiving ninth information from the network device includes: receiving, in the primary cell, the ninth information from the network device; or receiving, in the third cell, the ninth information from the network device, where the third cell is a secondary cell in which no beam failure occurs.

In a possible implementation, the sixth information is sent by using a fourth resource. The method further includes:
 if downlink information from the network device is successfully received in the secondary cell by using a fifth beam, determining that the fifth beam is a new available beam in the secondary cell, where the fifth beam is a beam associated with the fourth resource.

In the foregoing method, an association relationship between the fifth beam and the fourth resource is established, so that a fifth beam may not need to be indicated by using signaling, thereby reducing signaling overheads.

According to a sixth aspect, an embodiment of this application provides a beam failure processing method, including: receiving sixth information from a terminal device, where the sixth information is used to indicate at least a beam failure of a primary cell in a first cell and a second cell; the first cell is the primary cell and the second cell is a secondary cell, or the first cell is a secondary cell and the second cell is the primary cell; the sixth information is sent by the terminal device when a beam failure of the second cell is determined, after a beam failure of the first cell is determined, and before a beam of the first cell is recovered; and sending seventh information to the terminal device, where the seventh information is used to respond to the sixth information.

It can be learned from the foregoing process that when beam failures occur in both the primary cell and the secondary cell, a beam of at least the primary cell may be recovered. This can ensure that communication of the primary cell is preferentially recovered to be normal, thereby minimizing impact caused by beam failures of a plurality of cells.

In a possible implementation, the method further includes: receiving eighth information from the terminal device, where the eighth information is used to indicate a beam failure of the secondary cell.

In a possible implementation, the sixth information is used to indicate the beam failure of the first cell, and is used to indicate the beam failure of the second cell. The receiving sixth information from a terminal device includes: receiving the sixth information by using a third resource, where the third resource is a random access resource, a scheduling request resource, an uplink control resource, an uplink data resource, a media access control control element resource, or a dedicated beam recovery request resource.

In a possible implementation, the method further includes: sending ninth information to the terminal device, where the ninth information is used to indicate a fifth beam, and the fifth beam is used by the terminal device to receive downlink information in the secondary cell.

In a possible implementation, the sending ninth information to the terminal device includes: sending the ninth information in the primary cell; or sending the ninth information in a third cell, where the third cell is a secondary cell in which no beam failure occurs.

In the foregoing method, the ninth information is obtained through the primary cell or the third cell, so that a latency of recovering a beam of the secondary cell can be reduced, and system efficiency can be improved.

In a possible implementation, the sixth information is sent by using a fourth resource. The method further includes: determining a fifth beam associated with the fourth resource, and sending downlink information to the terminal device in the secondary cell by using the fifth beam.

In the foregoing method, an association relationship between the fifth beam and a fifth resource is established, so that a first beam may not need to be indicated by using signaling, thereby reducing signaling overheads.

According to a seventh aspect, an embodiment of this application provides a communication apparatus, including a processor. The processor is coupled to a memory, and may be configured to execute instructions in the memory, to implement the method according to any one of the foregoing possible designs. Optionally, the communication apparatus further includes a memory. Optionally, the memory may be integrated with the processor, or the memory and the processor are disposed separately. Optionally, the communication apparatus further includes a communication interface, and the processor is coupled to the communication interface.

In an implementation, the communication apparatus is a terminal device or a network device, and the communication interface may be a transceiver or an input/output interface.

In another implementation, the communication apparatus is a chip configured in a terminal device or a network device. When the communication apparatus is the chip configured in the terminal device or the network device, the communication interface may be an input/output interface.

Optionally, the transceiver may be a transceiver circuit. Optionally, the input/output interface may be an input/output circuit.

In a possible implementation, the communication apparatus includes corresponding functional units, respectively configured to implement the steps in the foregoing method. A function may be implemented by hardware, or may be implemented by hardware executing corresponding software. The hardware or the software includes one or more units corresponding to the foregoing function.

In a possible implementation, a structure of the communication apparatus includes a processing unit and a transceiver unit. The units may perform corresponding functions in the foregoing method example. For details, refer to detailed descriptions in the method example. Details are not described herein again.

According to an eighth aspect, an embodiment of this application provides a processor, including an input circuit, an output circuit, and a processing circuit. The processing circuit is configured to: receive a signal through the input circuit, and transmit a signal through the output circuit, so that the processor performs the method according to any one of the possible designs.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. A specific implementation of the processor and various circuits is not limited in this application.

According to a ninth aspect, an embodiment of this application provides a computer-readable storage medium. The computer storage medium stores a computer-readable instruction. When a computer reads and executes the computer-readable instruction, the computer is enabled to perform the method according to any one of the foregoing possible designs.

According to a tenth aspect, an embodiment of this application provides a computer program product. When a computer reads and executes the computer program product, the computer is enabled to perform the method according to any one of the foregoing possible designs.

According to an eleventh aspect, an embodiment of this application provides a chip. The chip is connected to a memory, and is configured to read and execute a software program stored in the memory, to implement the method according to any one of the foregoing possible designs.

According to a twelfth aspect, an embodiment of this application provides a system, where the system includes the foregoing terminal device and network device.

DESCRIPTION OF EMBODIMENTS

The following describes embodiments of this application in detail with reference to accompanying drawings of the specification.

The embodiments of this application may be applied to various mobile communication systems, for example, a new radio (new radio, NR) system, a long term evolution (long term evolution, LTE) system, a long term evolution-advanced (long term evolution-advanced, LTE-A) system, a universal mobile telecommunications system (universal mobile telecommunications system, UMTS), an evolved long term evolution (evolved long term evolution, eLTE) system, a future communication system, and other communication systems. Specifically, this is not limited herein.

Figure 1:
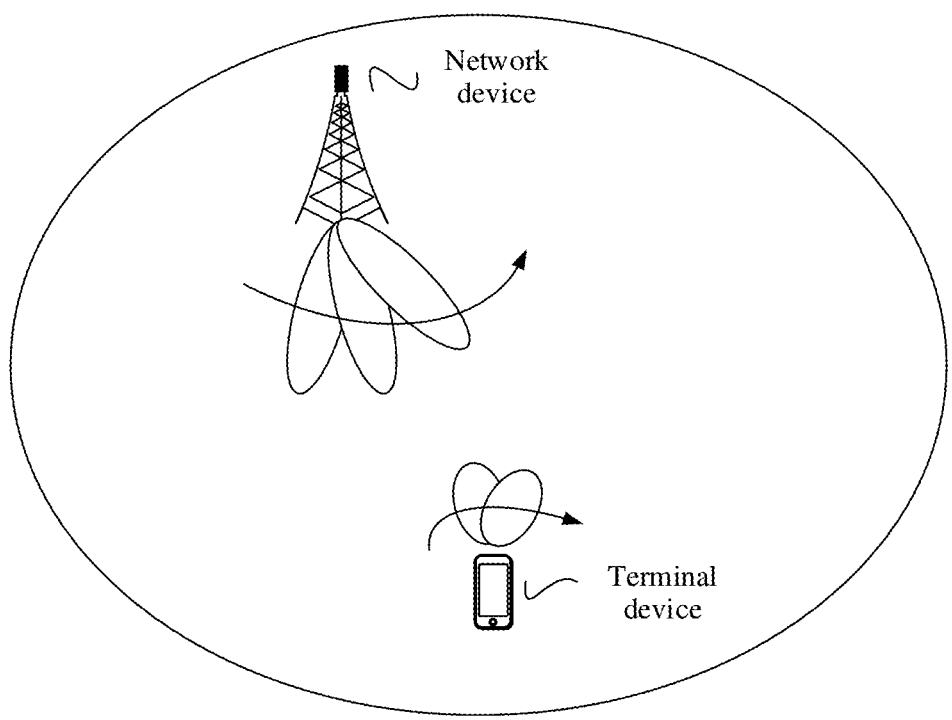
FIG. 1 is a schematic diagram of a communication system applicable to a method according to an embodiment of this application.

For ease of understanding the embodiments of this application, a communication system shown in FIG. 1 is first used as an example to describe in detail a communication system applicable to the embodiments of this application. FIG. 1 is a schematic diagram of a communication system applicable to a method according to an embodiment of this application. As shown in FIG. 1, the communication system includes a network device and a terminal device. Based on a system architecture shown in FIG. 1, a 5G NR system is used as an example. The 5G NR system mainly performs beamforming on a signal by using an antenna array, to provide a data transmission service for the terminal device by using a beam.

In the architecture shown in FIG. 1, when a beam failure occurs (where for example, beam misalignment between the network device and the terminal device is caused by factors such as sudden channel fluctuation, unexpected interruption due to an obstacle, and location change of the terminal device), the terminal device cannot decode any downlink (downlink, DL) signal, and the network device cannot decode any uplink (uplink, UL) signal. Consequently the terminal device is in a radio link failure (radio link failure, RLF) state. For the beam failure, a beam failure recovery method is currently provided. A main principle of the method is that when determining, based on a beam measurement result, that a beam failure occurs, the terminal device sends a BFRQ to the network device by using a random access resource. After receiving the BFRQ, the network device sends a beam failure recovery response (beam failure recovery response, BFRR) to the terminal device. After sending the BFRQ, if the BFRR is successfully received within a time window specified in a protocol, the terminal device considers that beam failure recovery succeeds; otherwise, the terminal device considers that beam failure recovery fails.

After sending the BFRR, the network device may further indicate a new beam pair to the terminal device by using higher layer signaling. The terminal device may communicate with the network device by using the new beam pair.

When the terminal device has a plurality of cells, the foregoing beam recovery method is applicable only to beam recovery of a primary cell. Based on this, the embodiments of this application provide a method used to resolve a problem of how to perform beam recovery when beam failures occur in both a secondary cell and a primary cell.

In the embodiments of this application, a terminal device is a device having a wireless transceiver function, or a chip that can be disposed in the device. The device having the wireless transceiver function may also be referred to as user equipment (user equipment, UE), an access terminal, a subscriber unit, a subscriber station, a mobile station, a remote station, a remote terminal, a mobile device, a user terminal, a user agent, or a user apparatus. During actual application, the terminal device in the embodiments of this application may be a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the foregoing device having the wireless transceiver function and the chip that can be disposed in the device are collectively referred to as the terminal device.

In the embodiments of this application, a network side device may be a radio access device in various standards, for example, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless fidelity (wireless fidelity, Wi-Fi) system, a wireless relay node, a wireless backhaul node, or a transmission point (transmission and reception point, TRP or a transmission point, TP), may be a gNB or a transmission point (TRP or TP) in a 5G (NR) system, one or a group of antenna panels (including a plurality of antenna panels) of a base station in the 5G system, or may be a network node that constitutes a gNB or a transmission point, for example, a baseband unit (BBU). Alternatively, in some deployments, the gNB may include a centralized unit (centralized unit, CU) and a DU. The gNB may further include an active antenna unit (active antenna unit, AAU for short). The CU implements some functions of the gNB, and the DU implements some other functions of the gNB. For example, the CU is responsible for processing a non-real-time protocol and service, and implements functions of a radio resource control (radio resource control, RRC) and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or may be classified into a network device in a core network (core network, CN). This is not limited in this application.

In addition, in the embodiments of this application, when beam failures occur in both a first cell and a second cell, the terminal device may suspend a beam failure recovery procedure of one of the cells. It should be noted that "suspend" herein may mean suspending the beam failure recovery procedure of the cell, and continuing the beam failure recovery procedure of the cell after beam recovery of the another cell succeeds.

In addition, in the embodiments of this application, when beam failures occur in both the first cell and the second cell, the terminal device alternatively terminates a beam failure recovery procedure of one of the cells. It should be noted that "terminate" herein may mean ending the beam failure recovery procedure of the cell, and not continuing the beam failure recovery procedure of the cell after beam recovery of the another cell succeeds.

In addition, in the embodiments of this application, when beam failures occur in both the first cell and the second cell, the terminal device may terminate a beam failure recovery procedure of one of the cells. It should be noted that "terminate" herein may mean directly ending the beam failure recovery procedure of the cell, and subsequently re-initiating the beam failure recovery procedure of the cell, or no longer executing the beam failure recovery procedure of the cell.

It should be noted that the embodiments of this application may be applied to a scenario in which a plurality of cells serve the terminal device, including but not limited to a CA scenario, a multi-TRP scenario, a dual connectivity (Dual Connectivity) scenario, a coordinated multipoint transmission (Coordinated Multipoint Transmission, CoMP) scenario, and the like. Examples are not listed one by one herein for description.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that the technical solutions provided in the embodiments of this application are also applicable to a similar technical problem as the network architecture evolves and a new service scenario emerges.

Figure 2:
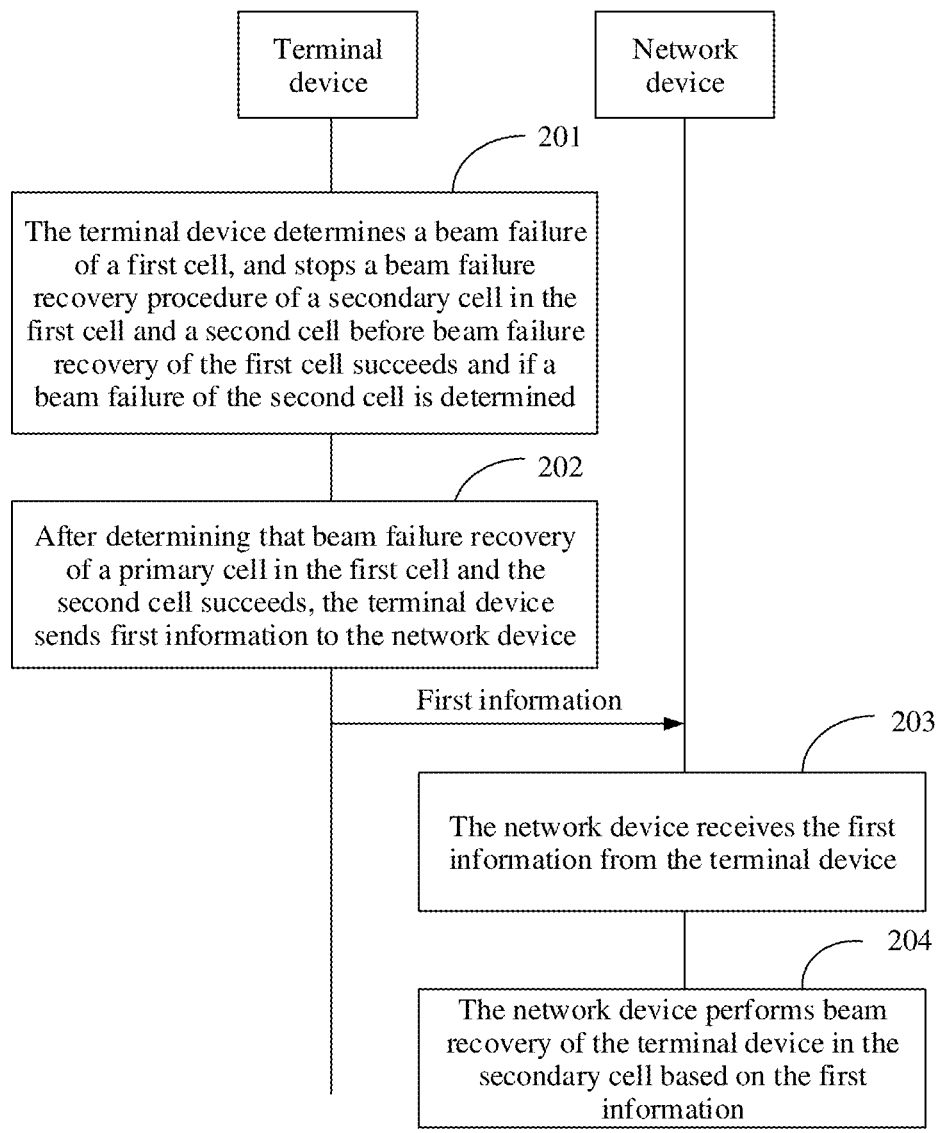
FIG. 2 is a schematic flowchart of a beam failure processing method according to an embodiment of this application.

FIG. 2 is a schematic flowchart of a beam failure processing method according to an embodiment of this application. The method includes the following steps.

Step 201: A terminal device determines a beam failure of a first cell, and suspends or terminates a beam failure recovery procedure of a secondary cell in the first cell and a second cell before beam failure recovery of the first cell succeeds and if a beam failure of the second cell is determined.

Optionally, when determining the beam failure of the second cell, the terminal device initiates or continues a beam failure recovery procedure of a primary cell in the first cell and the second cell.

The first cell is the primary cell and the second cell is the secondary cell, or the first cell is the secondary cell and the second cell is the primary cell. For ease of description, in the following descriptions in the embodiments of this application, if a "primary cell" appears, unless otherwise specified, the "primary cell" refers to a primary cell in a first cell and a second cell. For example, if the first cell is the primary cell, the "primary cell" refers to the first cell. Correspondingly, if the second cell is the primary cell, the "primary cell" refers to the second cell. Correspondingly, in the following descriptions in the embodiments of this application, if a "secondary cell" appears, unless otherwise specified, the "secondary cell" refers to a secondary cell in a first cell and a second cell. For example, if the first cell is the secondary cell, the "secondary cell" refers to the first cell. Correspondingly, if the second cell is the secondary cell, the "secondary cell" refers to the second cell.

Figure 3:
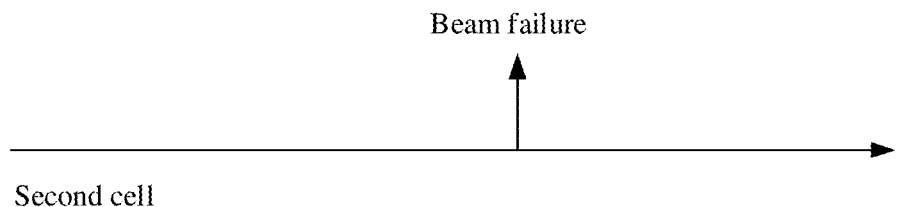
FIG. 3 is a schematic diagram of beam failure according to an embodiment of this application.
Figure 3:
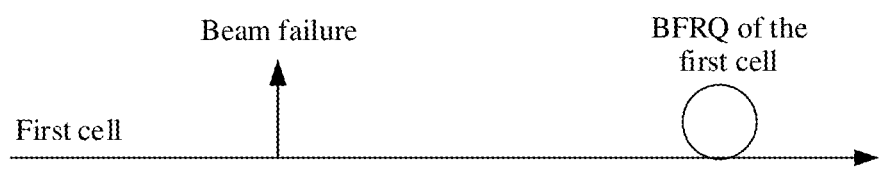

It should be noted that, in step 201, that the terminal device determines the beam failure of the second cell before the beam failure recovery of the first cell succeeds may refer to any one of the following scenarios. In a first possible scenario, as shown in FIG. 3, the terminal device first determines the beam failure of the first cell in the first cell, and determines the beam failure of the second cell before sending a beam failure recovery request of the first cell. The beam failure recovery request is used to indicate the beam failure of the first cell, or is used to request to perform beam failure recovery.

Figure 4:
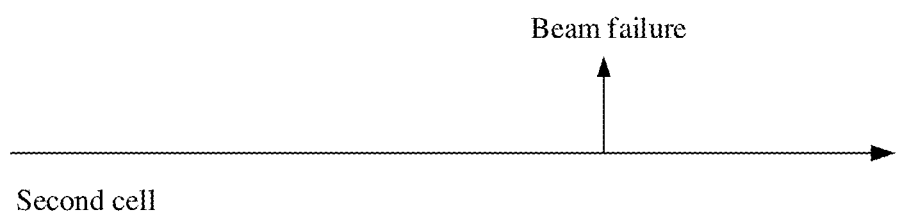
FIG. 4 is a schematic diagram of beam failure according to an embodiment of this application.
Figure 4:
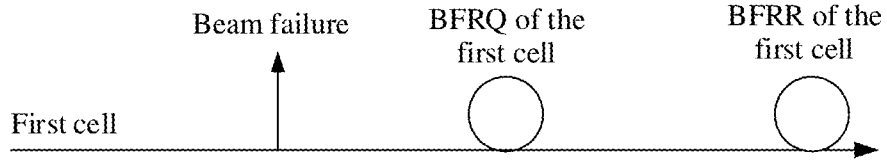

A second possible scenario is shown in FIG. 4. The terminal device first determines the beam failure of the first cell in the first cell, and sends a beam failure recovery request of the first cell. Before receiving a beam failure recovery request response of the first cell, the terminal device determines the beam failure of the second cell, where the beam failure recovery request response is used to respond to the beam failure recovery request of the first cell.

In this embodiment of this application, a manner in which the terminal device determines the beam failure of the first cell or the beam failure of the second cell may not be limited. For example, in the first cell, the terminal device may periodically detect a beam failure detection reference signal (beam failure detection reference signal, BFD RS) sent by a network device, and if signal quality of the BFD RS is less than a specified beam failure threshold, determines that one beam failure instance (beam failure instance) occurs. If the beam failure instances occur for N consecutive times, the terminal device determines that the beam failure occurs in the first cell. A value of N is specified in a protocol.

The foregoing is merely an example of a manner in which the terminal device determines a beam failure. In this application, another manner may also be used to determine whether a beam failure occurs. Examples are not listed one by one herein for description.

In this embodiment of this application, when suspending or terminating the beam failure recovery procedure of the secondary cell, the terminal device may not perform beam failure detection in the secondary cell. In other words, the terminal device may perform one or more of the following:

The terminal device suspends or terminates a beam failure detection timer of the secondary cell, and resets the timer.

The terminal device suspends or terminates a beam failure detection counter of the secondary cell, and resets the counter.

The terminal device does not send beam failure recovery request information of the secondary cell to the network device, where the beam failure recovery request information is used to indicate a beam failure of the secondary cell.

It should be noted that the beam failure detection timer is configured to time preset duration. The beam failure detection counter is configured to count a quantity of beam failure instances within the preset duration. When the beam failure detection timer does not expire, and a count value of the beam failure detection counter is greater than a preset value, it is considered that a beam failure occurs.

In this embodiment of this application, when suspending or terminating the beam failure recovery procedure of the secondary cell, the terminal device performs a beam failure recovery process for the primary cell. Specifically, after determining a beam failure of the primary cell, the terminal device may select, from a beam measurement resource set preconfigured by the network device, a resource that meets a preset condition, and send a BFRQ by using a random access resource associated with the resource. When successfully receiving a BFRR from the network device, the terminal device may determine that beam failure recovery of the primary cell succeeds.

Step 202: After determining that the beam failure recovery of the primary cell in the first cell and the second cell succeeds, the terminal device sends first information to the network device.

The first information is used to indicate the beam failure of the secondary cell in the first cell and the second cell. The first information may also be referred to as a name such as BFRQ. A name of the first information is not limited in this embodiment of this application. Examples are not listed one by one herein for description.

It should be noted that content carried in the first information is not limited in this embodiment of this application. For example, the first information may include any one or a combination of the following: a cause of the beam failure of the secondary cell, an identifier of the secondary cell, and an identifier of a new available beam.

The identifier of the secondary cell may be any information used to identify a cell. Similarly, the new available beam may also be indicated by using a beam ID. The new available beam is a candidate beam that meets a preset condition and that is selected by the terminal device from a candidate beam set when the terminal device determines that the beam failure occurs in the secondary cell. The terminal device expects the network device to send downlink information to the terminal device by using the new available beam. The candidate beam set is configured by the network device for the terminal. The preset condition may be that beam quality is higher than a specified candidate beam quality threshold, or the like. This is not limited in this embodiment of this application.

In a possible implementation, in this embodiment of this application, the terminal device may send the first information to the network device in the primary cell by using a dedicated (dedicated) scheduling request. Certainly, the foregoing is merely an example. The terminal device may alternatively send the first information in another manner. Details are not described herein again.

Step 203: The network device receives the first information from the terminal device.

Step 204: The network device performs beam recovery of the terminal device in the secondary cell based on the first information.

According to the foregoing procedure, when the beam failure of the first cell is determined, and before the beam failure recovery of the first cell succeeds, if the beam failure of the second cell is determined, the beam failure recovery procedure of the secondary cell in the first cell and the second cell may be suspended or terminated. The beam failure recovery procedure of the primary cell in the first cell and the second cell is preferentially performed, thereby ensuring that communication of the primary cell is preferentially recovered to be normal.

In step 204, the network device may further indicate a new available beam in the secondary cell and a new available beam in the primary cell to the terminal device. For details about how the network device indicates the new available beam in the primary cell, refer to descriptions in an existing technology, and details are not described in this embodiment of this application.

When the network device indicates the new available beam in the secondary cell, in a possible implementation, the network device may explicitly indicate the new available beam in the secondary cell to the terminal device. Specifically, after receiving the first information, the network device may send second information to the terminal device, where the second information is used to indicate a first beam. The first beam is the new available beam of the terminal device in the secondary cell, and the terminal device may receive, in the secondary cell, downlink information from the network device by using the first beam.

The network device may send the second information in a plurality of manners. In a first possible implementation, the network device may send the second information to the terminal device in the primary cell. In this implementation, the network device may send the second information by using radio resource control (radio resource control, RRC) signaling, media access control (media access control, MAC) control element (Control Element, CE) signaling, or downlink control information (downlink control information, DCI).

The RRC signaling and the MAC-CE signaling are carried by using a physical downlink shared channel (physical downlink shared channel, PDSCH), and the DCI is carried by using a physical downlink control channel (physical downlink control channel, PDCCH).

In this implementation, the first beam may be a beam selected by the network device. A specific selection is not limited in this embodiment of this application. Certainly, the first beam may alternatively be determined in another manner. Examples are not listed one by one herein for description.

In this implementation, the terminal device may receive, in the primary cell, the second information from the network device, and receive, in the secondary cell, the downlink data from the network device by using the first beam indicated by the second information.

In a second possible implementation, the network device may send the second information to the terminal device in a third cell. The third cell is a secondary cell in which no beam failure occurs, and the third cell is a cell other than the first cell and the second cell.

In this implementation, the network device may send the second information to the terminal device in the third cell by using RRC signaling, MAC-CE signaling, or DCI.

Similarly, in this implementation, the first beam may be a beam selected by the network device. A specific selection is not limited in this embodiment of this application. Certainly, the first beam may alternatively be determined in another manner. Examples are not listed one by one herein for description.

In this embodiment of this application, the network device may alternatively implicitly indicate the new available beam in the secondary cell to the terminal device. In this implementation, the first information sent by the terminal device is sent by using a first resource, where the first resource has an association relationship with the first beam, and the association relationship is preconfigured. After receiving the first information, the network device sends the downlink data to the terminal device by using the first beam associated with the first information. When the terminal device correctly receives the downlink information by using the first beam, it indicates that the first beam may be used in the secondary cell, and the terminal device may use the first beam as the new available beam of the terminal device in the secondary cell. According to this method, the beam failure recovery procedure of the secondary cell can be accelerated.

For example, after the network device receives the first information, the network device sends a PDCCH in the secondary cell by using the first beam. If the terminal device successfully receives, by using the first beam, the PDCCH sent by the network device, the terminal device determines that the first beam is the new available beam in the secondary cell.

In another possible implementation, a third beam used by the terminal device to send the first information has an association relationship with the first beam. After receiving the first information, the network device may use a beam associated with the third beam as the first beam. The association relationship between the third beam and the first beam is preconfigured.

In this embodiment of this application, the terminal device determines the beam failure of the first cell, and before the beam failure recovery of the first cell succeeds, if the beam failure of the second cell is determined, the terminal device may alternatively suspend or terminate the beam failure recovery procedure of the primary cell in the first cell and the second cell. For details, refer to the following description.

Figure 5:
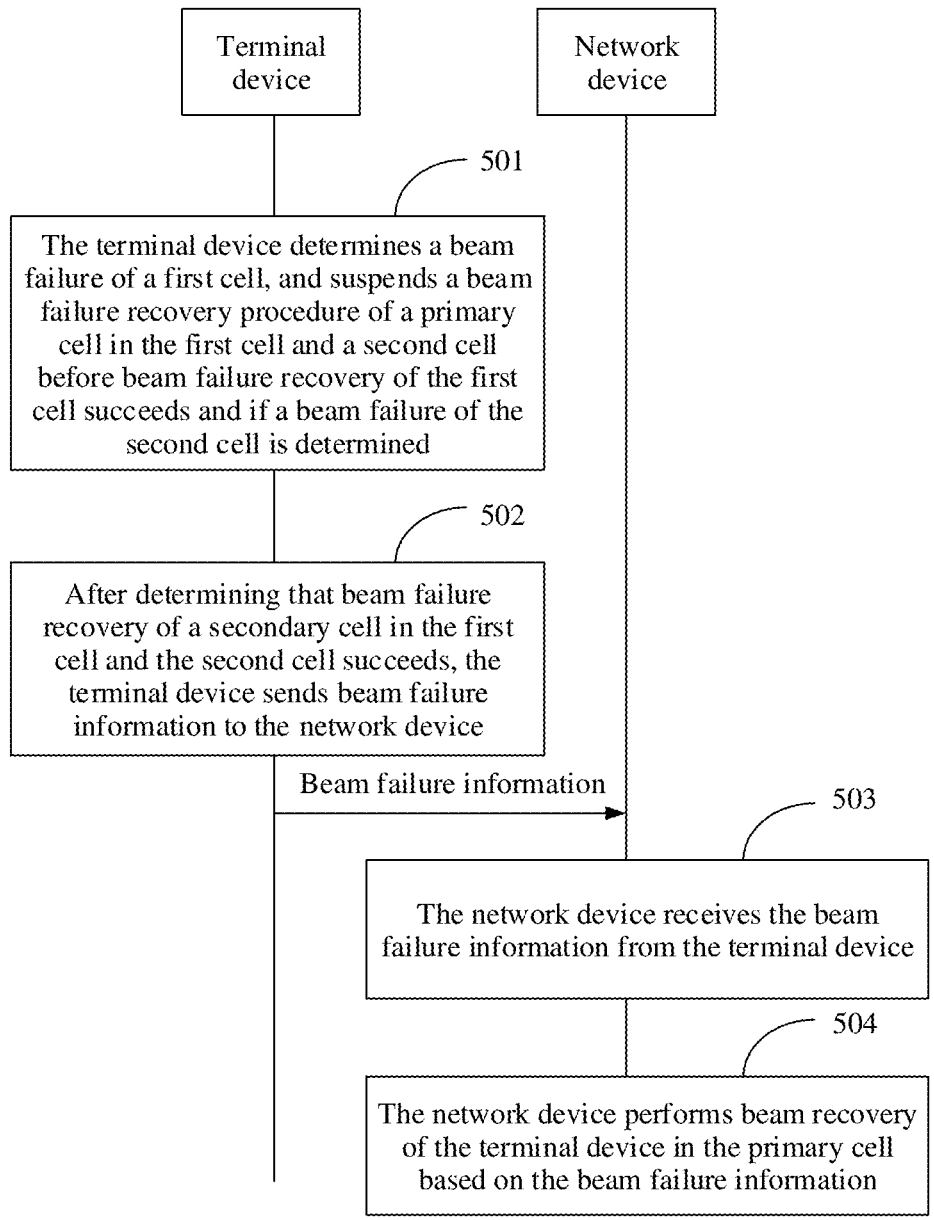
FIG. 5 is a schematic diagram of a beam failure processing method according to an embodiment of this application.

FIG. 5 is a schematic flowchart of a beam failure processing method according to an embodiment of this application. The method includes the following steps.

Step 501: A terminal device determines a beam failure of a first cell, and suspends or terminates a beam failure recovery procedure of a primary cell in the first cell and a second cell before beam failure recovery of the first cell succeeds and if a beam failure of the second cell is determined.

The first cell is the primary cell and the second cell is a secondary cell, or the first cell is a secondary cell and the second cell is the primary cell. For ease of description, in the following descriptions in the embodiments of this application, if a "primary cell" appears, unless otherwise specified, the "primary cell" refers to a primary cell in a first cell and a second cell. For example, if the first cell is the primary cell, the "primary cell" refers to the first cell. Correspondingly, if the second cell is the primary cell, the "primary cell" refers to the second cell. Correspondingly, in the following descriptions in the embodiments of this application, if a "secondary cell" appears, unless otherwise specified, the "secondary cell" refers to a secondary cell in a first cell and a second cell. For example, if the first cell is the secondary cell, the "secondary cell" refers to the first cell. Correspondingly, if the second cell is the secondary cell, the "secondary cell" refers to the second cell.

In step 501, that the terminal device determines the beam failure of the second cell before the beam failure recovery of the first cell succeeds may refer to any scenario described in FIG. 3 or FIG. 4. Details are not described herein again.

In this implementation, when suspending or terminating the beam failure recovery procedure of the primary cell, the terminal device performs a beam failure recovery process for the secondary cell. Specifically, after the terminal device determines a beam failure of the secondary cell, the terminal device may send a beam failure recovery request of the secondary cell to a network device in the primary cell by using a dedicated (dedicated) scheduling request. Beam failure request information of the secondary cell is used to indicate the beam failure of the secondary cell, or is used to request to perform beam recovery of the secondary cell. Certainly, the foregoing is merely an example. The terminal device may alternatively send the beam failure recovery request of the secondary cell in another manner. Details are not described herein again. When successfully receiving a BFRR from the network device for the beam failure recovery request of the secondary cell, the terminal device may determine that beam failure recovery of the secondary cell succeeds.

Step 502: After determining that the beam failure recovery of the secondary cell in the first cell and the second cell succeeds, the terminal device sends beam failure information to the network device.

The beam failure information is used to indicate a beam failure of the primary cell in the first cell and the second cell. The beam failure information may also be referred to as a name such as BFRQ. A name of the beam failure information is not limited in this embodiment of this application. Examples are not listed one by one herein for description.

It should be noted that content carried in the beam failure information is not limited in this embodiment of this application. For example, the beam failure information may include any one or a combination of the following: a cause of the beam failure of the primary cell and an identifier of the primary cell.

Step 503: The network device receives the beam failure information from the terminal device.

Step 504: The network device performs beam recovery of the terminal device in the primary cell based on the beam failure information.

For details about how the network device implements beam failure recovery of the primary cell and the beam failure recovery of the secondary cell, refer to the descriptions in the procedure shown in FIG. 2. Details are not described herein again.

In this embodiment of this application, when determining the beam failure of the first cell, and determining the beam failure of the second cell, the terminal device may perform beam recovery for both the first cell and the second cell. Details are described below.

Figure 6:
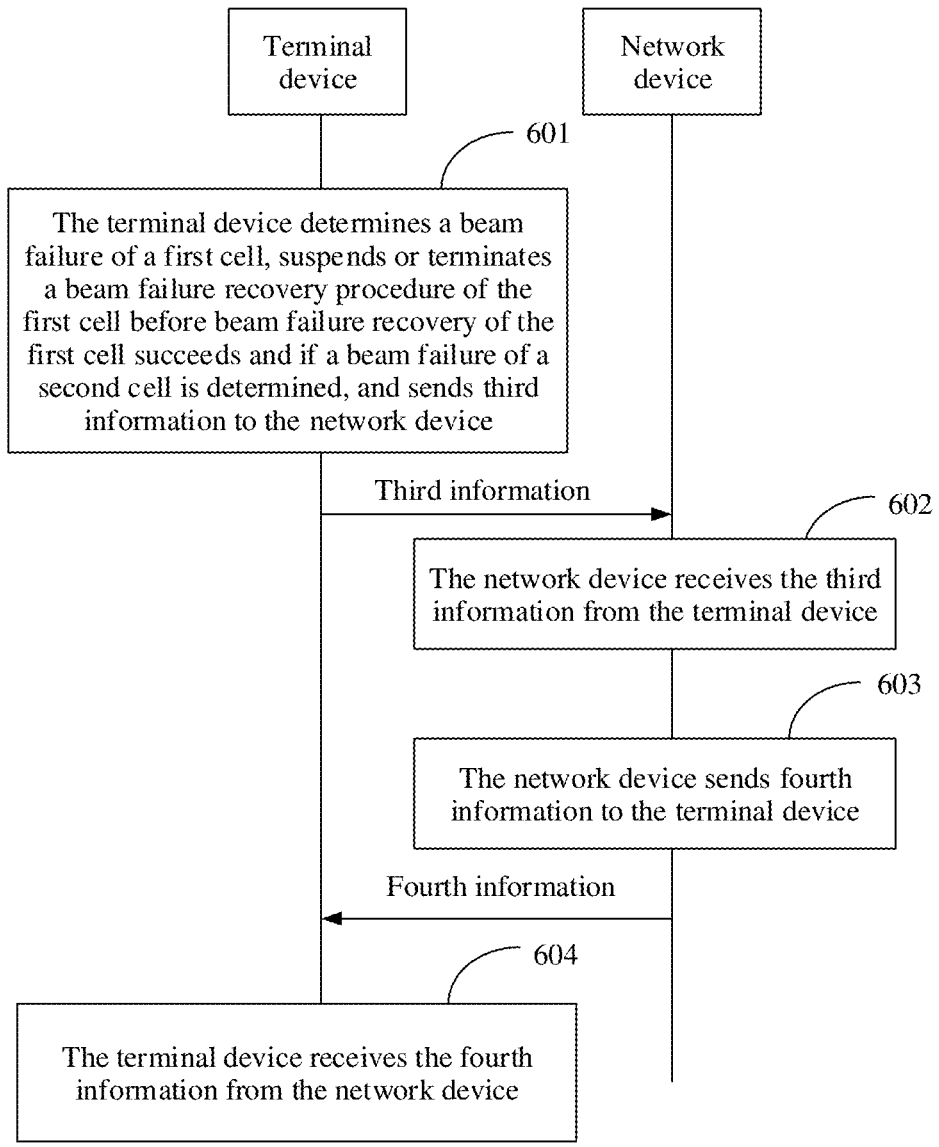
FIG. 6 is a schematic diagram of a beam failure processing method according to an embodiment of this application.

FIG. 6 is a schematic flowchart of a beam failure processing method according to an embodiment of this application. The method includes the following steps.

Step 601: A terminal device determines a beam failure of a first cell, suspends or terminates a beam failure recovery procedure of the first cell before beam failure recovery of the first cell succeeds and if a beam failure of a second cell is determined, and sends third information to a network device.

The third information is used to indicate at least a beam failure of a primary cell in the first cell and the second cell. Alternatively, the third information is used to indicate at least a beam of a primary cell in the first cell and the second cell. The third information may alternatively be a BFRQ. A name of the third information is not limited in this embodiment of this application. Examples are not listed one by one herein for description. The first cell is the primary cell and the second cell is a secondary cell, or the first cell is a secondary cell and the second cell is the primary cell. For ease of description, in the following descriptions in the embodiments of this application, if a "primary cell" appears, unless otherwise specified, the "primary cell" refers to a primary cell in a first cell and a second cell. Correspondingly, if a "secondary cell" appears, unless otherwise specified, the "secondary cell" refers to a secondary cell in a first cell and a second cell.

It should be noted that there are two possible scenarios in this step, and the two scenarios are separately described in the following.

Scenario 1: The terminal device first determines the beam failure of the first cell in the first cell, and sends a beam failure recovery request of the first cell before determining the beam failure of the second cell. Beam failure request information of the first cell is used to indicate the beam failure of the first cell, or is used to request to perform beam recovery of the first cell.

Case 1 in scenario 1: When the first cell is the secondary cell, the terminal device may suspend or terminate the beam failure recovery procedure of the first cell. In this case, in this scenario, the third information sent by the terminal device may be used to indicate at least the beam failure of the primary cell.

It should be noted that, when the third information is used only to indicate the beam failure of the primary cell, after the terminal device determines that beam failure recovery of the primary cell succeeds, the terminal device may continue the beam failure recovery procedure of the first cell in a case that the beam failure recovery procedure of the first cell is suspended or terminated. In a case that the beam failure recovery procedure of the first cell is terminated, the terminal device may re-initiate the beam failure recovery procedure of the first cell.

Case 2 in scenario 1: When the first cell is the primary cell, the terminal device may suspend or terminate the beam failure recovery procedure of the first cell. In this case, in this scenario, the third information sent by the terminal device may be used to indicate the beam failure of the first cell and the beam failure of the second cell.

In this case, the terminal device may perform beam failure recovery on both the first cell and the second cell.

Certainly, in this case, the third information may also be used only to indicate the beam failure of the primary cell. This is not limited in this embodiment of this application.

Scenario 2: When determining the beam failure of the second cell, the terminal device has not sent the beam failure request information of the first cell. In this case, the terminal device may no longer send the beam failure request information of the first cell.

It should be noted that content carried in the third information is not limited in this embodiment of this application. For example, the third information may include any one or a combination of the following: a cause of the beam failure of the primary cell, an identifier of the primary cell, a cause of a beam failure of the secondary cell, an identifier of the secondary cell, and an identifier of a new available beam in the secondary cell.

In a possible implementation, when the third information is used to indicate the beam failure of the first cell and is used to indicate the beam failure of the second cell, the terminal device may send the third information to the network device by using a second resource.

The second resource may be a random access resource (where the random access resource includes but is not limited to a dedicated random access preamble and a random access time-frequency resource), a scheduling request resource, an uplink control resource, an uplink data resource, a media access control control element resource, or a dedicated beam recovery request resource.

The second resource may be preconfigured by the network device for the terminal device, may be semi-persistently activated by the network device for the terminal device, or may be dynamically indicated by the network device for the terminal device. This is not limited in this embodiment of this application.

In a possible implementation, when the third information is used to indicate the beam failure of the primary cell in the first cell and the second cell, the terminal device may send the third information to the network device by using the random access time-frequency resource.

In a possible implementation, when the third information is used to indicate the beam failure of the secondary cell in the first cell and the second cell, the terminal device may send the third information to the network device by using the scheduling request resource.

Step 602: The network device receives the third information from the terminal device.

Step 603: The network device sends fourth information to the terminal device.

The fourth information is used to respond to the third information. For example, when the third information is a BFRQ or a scheduling request (scheduling request, SR) sent by using the scheduling request resource, the fourth information may be a BFRR. Details of another case are not described again.

In this embodiment of this application, after the network device sends the fourth information, the network device may further indicate a new available beam in the secondary cell and a new available beam in the primary cell to the terminal device. For details about how the network device indicates the new available beam in the primary cell, refer to descriptions in an existing technology, and details are not described in this embodiment of this application.

The network device may explicitly indicate the new available beam in the secondary cell to the terminal device. Specifically, after receiving the third information, the network device may send fifth information to the terminal device, where the fifth information is used to indicate a second beam. The second beam is the new available beam of the terminal device in the secondary cell, and the terminal device may receive, in the secondary cell, downlink data from the network device by using the second beam.

The network device may send the fifth information in a plurality of manners. In a first possible implementation, the network device may send the fifth information to the terminal device in the primary cell. In this implementation, the network device may send the fifth information in the primary cell by using RRC signaling, MAC-CE signaling, or DCI.

The RRC signaling and the MAC-CE signaling are carried by using a physical downlink shared channel (physical downlink shared channel, PDSCH), and the DCI is carried by using a physical downlink control channel (physical downlink control channel, PDCCH).

In this implementation, the second beam may be a beam selected by the network device. A specific selection is not limited in this embodiment of this application. Certainly, the second beam may alternatively be determined in another manner. Examples are not listed one by one herein for description.

In this implementation, the terminal device may receive, in the primary cell, the fifth information from the network device, and receive, in the secondary cell, the downlink information from the network device by using the second beam indicated by the fifth information.

In a second possible implementation, the network device may send the fifth information to the terminal device in a third cell. The third cell is a secondary cell in which no beam failure occurs, and the third cell is a cell other than the first cell and the second cell.

In this implementation, the network device may send the fifth information to the terminal device in the third cell by using RRC signaling, MAC-CE signaling, or DCI.

Similarly, in this implementation, the second beam may be a beam selected by the network device. A specific selection is not limited in this embodiment of this application. Certainly, the second beam may alternatively be determined in another manner. Examples are not listed one by one herein for description.

In this embodiment of this application, the network device may alternatively implicitly indicate the new available beam in the secondary cell to the terminal device. In this implementation, the third information sent by the terminal device is sent by using the second resource, and the second resource has an association relationship with the second beam. After receiving the third information, the network device sends downlink data to the terminal device by using the second beam associated with the third information. When receiving the downlink information by using the second beam, the terminal device determines that the second beam is the new available beam of the terminal device in the secondary cell.

It should be noted that in this embodiment of this application, the network device may further indicate the new available beam in the primary cell to the terminal device by using the RRC signaling or the MAC-CE signaling. Details about how to indicate are not limited in this embodiment of this application, and are not described herein again.

In another possible implementation, a fourth beam used by the terminal device to send the third information has an association relationship with the second beam. After receiving the third information, the network device may use a beam associated with the fourth beam as the second beam. The association relationship between the fourth beam and the second beam is preconfigured.

Step 604: The terminal device receives the fourth information from the network device.

According to the foregoing procedure, when the beam failure of the first cell is determined, and before the beam failure recovery of the first cell succeeds, if the beam failure of the second cell is determined, the beam failure recovery procedure of the first cell may be suspended or terminated, and a beam of at least the primary cell in the first cell and the second cell is recovered, thereby ensuring that communication of the primary cell is recovered to be normal. Further, if the beam of the primary cell is recovered, and a beam of the secondary cell in the first cell and the second cell is recovered, beam failure recovery efficiency can be increased, a latency in beam recovery can be reduced, and robustness of the secondary cell can be improved.

An embodiment of this application further provides a beam failure processing method. Details are described below.

Figure 7:
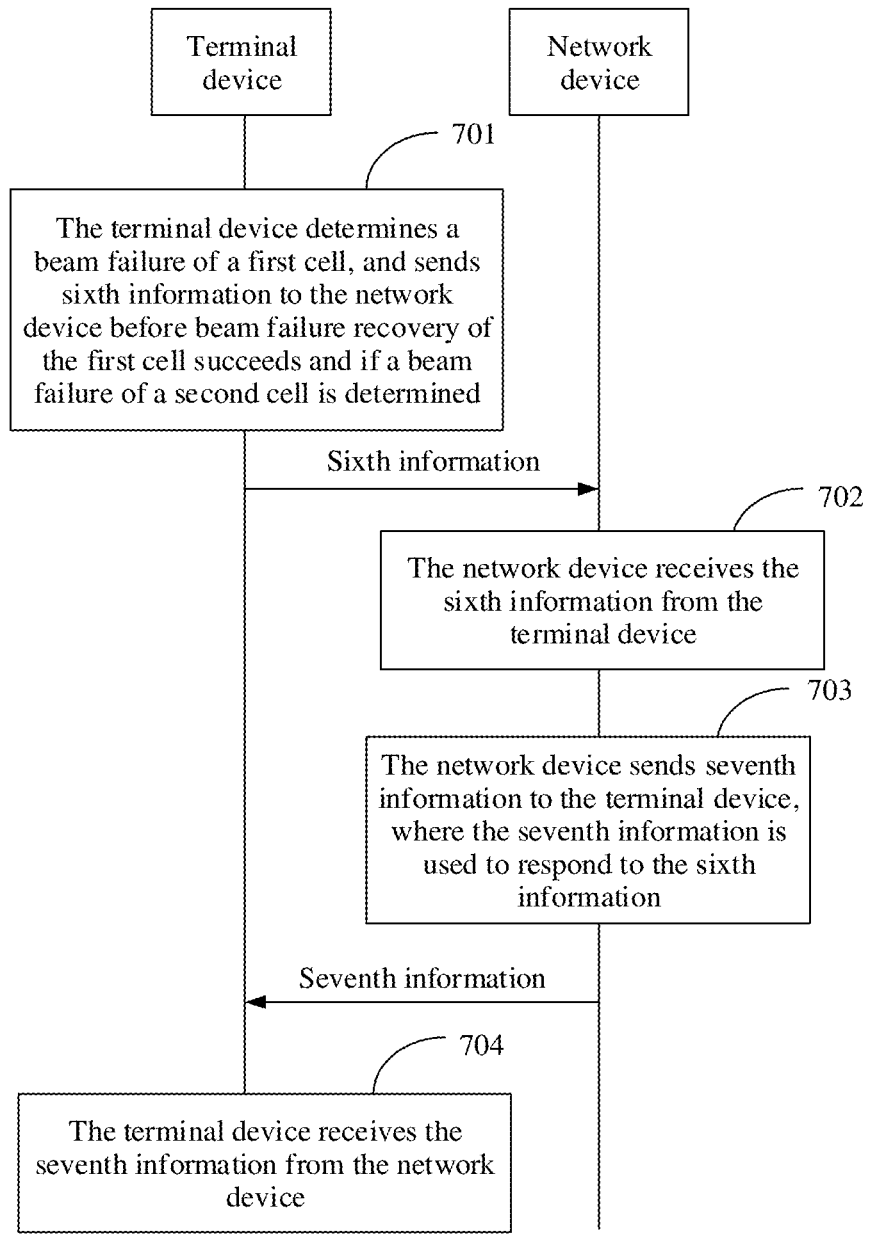
FIG. 7 is a schematic diagram of a beam failure processing method according to an embodiment of this application.

FIG. 7 is a schematic flowchart of a beam failure processing method according to an embodiment of this application. The method includes the following steps.

Step 701: A terminal device determines a beam failure of a first cell, and sends sixth information to a network device before beam failure recovery of the first cell succeeds and if a beam failure of a second cell is determined.

The first cell is a primary cell and the second cell is a secondary cell, or the first cell is a secondary cell and the second cell is a primary cell. The sixth information is used to indicate at least a beam failure of the primary cell in the first cell and the second cell. The sixth information may also be referred to as a name such as BFRQ. A name of the sixth information is not limited in this embodiment of this application. Examples are not listed one by one herein for description.

Step 702: The network device receives the sixth information from the terminal device.

Step 703: The network device sends seventh information to the terminal device, where the seventh information is used to respond to the sixth information.

Step 704: The terminal device receives the seventh information from the network device.

According to the foregoing procedure, when the beam failure of the first cell is determined, and before the beam failure recovery of the first cell succeeds, if the beam failure of the second cell is determined, the terminal device may preferentially perform a beam failure recovery procedure of the primary cell in the first cell and the second cell, thereby ensuring that communication of the primary cell is preferentially recovered to be normal.

In the procedure shown in FIG. 7, there may be a plurality of different scenarios. Details are separately described below.

Scenario 1: The first cell is the primary cell and the second cell is the secondary cell. The terminal device first determines the beam failure of the first cell in the first cell, and sends a beam failure recovery request of the first cell before determining the beam failure of the second cell. Beam failure request information of the first cell is used to indicate the beam failure of the first cell, or is used to request to perform beam recovery of the first cell.

In scenario 1, the terminal device may suspend or terminate a beam failure recovery procedure of the first cell. In this case, in this scenario, the sixth information sent by the terminal device may be used to indicate the beam failure of the primary cell.

In scenario 1, the terminal device preferentially performs beam failure recovery of the primary cell by suspending or terminating a beam failure recovery procedure of the secondary cell, to ensure that communication of the primary cell is preferentially recovered to be normal.

In scenario 1, the terminal device may select a beam from a preset candidate beam set as a first beam, and send, by using the first beam, the sixth information to the network device in a random access resource associated with the first beam.

When receiving the seventh information from the network device, the terminal device may determine that the beam failure recovery of the primary cell succeeds.

Further, in scenario 1, after the beam failure recovery of the primary cell succeeds, the terminal device may continue the beam failure recovery procedure of the first cell in a case that the beam failure recovery procedure of the first cell is suspended. In a case that the beam failure recovery procedure of the first cell is terminated, the terminal device may re-initiate the beam failure recovery procedure of the first cell.

For example, after the beam failure recovery of the primary cell succeeds, the terminal device may send eighth information to the network device, where the eighth information is used to indicate a beam failure of the secondary cell.

Scenario 2: The first cell is the secondary cell and the second cell is the primary cell. The terminal device first determines the beam failure of the first cell in the first cell, and does not send a beam failure recovery request of the first cell before determining the beam failure of the second cell.

In scenario 2, the terminal device no longer sends the beam failure recovery request of the first cell before the beam failure of the second cell is recovered. In this case, in this scenario, the sixth information sent by the terminal device may be used to indicate the beam failure of the primary cell. For details about how the terminal device sends the sixth information, refer to the descriptions in scenario 1. Details are not described herein again.

In scenario 2, the terminal device preferentially performs beam failure recovery of the primary cell by not performing a beam failure recovery procedure of the secondary cell, to ensure that communication of the primary cell is preferentially recovered to be normal.

Further, in scenario 2, after the beam failure recovery of the primary cell succeeds, the terminal device may perform a beam failure recovery procedure of the first cell, to perform beam failure recovery of the first cell.

For example, after the beam failure recovery of the primary cell succeeds, the terminal device may send eighth information to the network device, where the eighth information is used to indicate a beam failure of the secondary cell.

Scenario 3: The first cell is the primary cell and the second cell is the secondary cell.

In scenario 3, the sixth information sent by the terminal device is used to indicate the beam failure of the primary cell. In this case, before the beam failure recovery of the first cell succeeds, the terminal device does not perform a beam failure recovery procedure of the second cell even if the beam failure of the second cell is determined, and starts to perform the beam failure recovery procedure of the second cell only after the beam failure recovery of the first cell succeeds.

Scenario 4: The first cell is the secondary cell and the second cell is the primary cell. Alternatively, the first cell is the primary cell and the second cell is the secondary cell.

In scenario 4, the terminal device first determines the beam failure of the first cell in the first cell, and before determining the beam failure of the second cell, the terminal device may terminate a beam failure recovery procedure of the first cell regardless of whether a beam failure recovery request of the first cell is sent. In this case, in this scenario, the sixth information sent by the terminal device may be used to indicate the beam failure of the primary cell and used to indicate a beam failure of the secondary cell.

In scenario 4, the terminal device performs beam failure recovery procedures of the primary cell and the secondary cell by using the sixth information, to ensure that communications of the primary cell and the secondary cell are recovered to be normal.

In scenario 4, the terminal device may send the sixth information to the network device by using a third resource, where the third resource is a random access resource, a scheduling request resource, an uplink control resource, an uplink data resource, a media access control control element resource, or a dedicated beam recovery request resource. Details of another case are not described again.

In this embodiment of this application, after the network device sends the seventh information, the network device may further indicate a new available beam in the secondary cell and a new available beam in the primary cell to the terminal device. For details about how the network device indicates the new available beam in the primary cell, refer to descriptions in an existing technology, and details are not described in this embodiment of this application.

The network device may explicitly indicate the new available beam in the secondary cell to the terminal device. Specifically, the network device may send ninth information to the terminal device, where the ninth information is used to indicate a fifth beam. The fifth beam is the new available beam of the terminal device in the secondary cell, and the terminal device may receive, in the secondary cell, downlink information from the network device by using the fifth beam.

The network device may send the ninth information in a plurality of manners. In a first possible implementation, the network device may send the ninth information to the terminal device in the primary cell. In this implementation, the network device may send the fifth information in the primary cell by using RRC signaling, MAC-CE signaling, or DCI.

In this implementation, the fifth beam may be a beam selected by the network device. A specific selection is not limited in this embodiment of this application. Certainly, the fifth beam may alternatively be determined in another manner. Examples are not listed one by one herein for description.

In this implementation, the terminal device may receive, in the primary cell, the ninth information from the network device, and receive, in the secondary cell, the downlink information from the network device by using the fifth beam indicated by the ninth information.

In a second possible implementation, the network device may send the ninth information to the terminal device in a third cell. The third cell is a secondary cell in which no beam failure occurs, and the third cell is a cell other than the first cell and the second cell.

In this implementation, the network device may send the ninth information to the terminal device in the third cell by using RRC signaling, MAC-CE signaling, or DCI.

Similarly, in this implementation, the fifth beam may be a beam selected by the network device. A specific selection is not limited in this embodiment of this application. Certainly, the fifth beam may alternatively be determined in another manner. Examples are not listed one by one herein for description.

In this embodiment of this application, the network device may alternatively implicitly indicate the new available beam in the secondary cell to the terminal device. In this implementation, the sixth information sent by the terminal device is sent by using the fourth resource, and the fourth resource has an association relationship with the fifth beam. After receiving the sixth information, the network device sends downlink information to the terminal device by using the fifth beam associated with the sixth information. When receiving the downlink information by using the fifth beam, the terminal device determines that the fifth beam is the new available beam of the terminal device in the secondary cell.

In the foregoing embodiments provided in this application, the method provided in the embodiments of this application is separately described from a perspective of interaction between the network device and the terminal device. To implement functions in the methods provided in the embodiments of this application, the terminal device and the network device may include a hardware structure and/or a software module, and implement the functions in a form of the hardware structure, the software module, or a combination of the hardware structure and the software module. Whether a function in the foregoing functions is performed in a manner of the hardware structure, the software module, or the combination of the hardware structure and the software module depends on particular applications and design constraint conditions of the technical solution.

Figure 8:
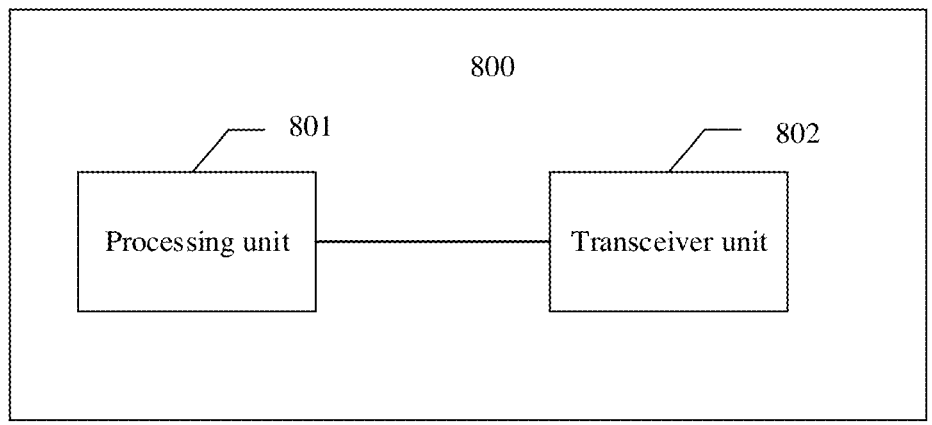
FIG. 8 is a schematic diagram of a structure of a communication apparatus according to an embodiment of this application.

Same as the foregoing concept, as shown in FIG. 8, an embodiment of this application further provides an apparatus 800, configured to implement a function of the terminal device or the network device in the foregoing method. The apparatus may be a chip or a chip system. In this embodiment of this application, the chip system may include a chip, or may include a chip and another discrete component. The apparatus 800 may include a processing unit 801 and a transceiver unit 802. When the apparatus is the chip or the chip system, the processing unit 801 may be a processor, a processing circuit, or a logic circuit on the chip or the chip system. The transceiver unit 802 may be an input/output interface, an interface circuit, an output circuit, an input circuit, a pin, a related circuit, or the like on the chip or the chip system, and can input/output data processed by the processing unit 801, and communicate with a network through an antenna port.

In the embodiments of this application, division into modules is an example, and is merely logical function division. During actual implementation, there may be another division manner. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

For example, when the apparatus 800 implements a function of the terminal device in the procedure shown in FIG. 2, the processing unit 801 is configured to: determine a beam failure of a first cell, and suspend or terminate a beam failure recovery procedure of a secondary cell in the first cell and a second cell before beam failure recovery of the first cell succeeds and if a beam failure of a second cell is determined, where the first cell is a primary cell and the second cell is the secondary cell, or the first cell is the secondary cell and the second cell is a primary cell.

The transceiver unit 802 is configured to: after determining that beam failure recovery of the primary cell in the first cell and the second cell succeeds, send first information to a network device, where the first information is used to indicate a beam failure of the secondary cell in the first cell and the second cell.

In a possible implementation, the suspending or terminating a beam failure recovery procedure of a secondary cell in the first cell and the second cell includes one or more of the following:
  suspending or terminating a beam failure detection timer of the secondary cell, and resetting the timer;
  suspending or terminating a beam failure detection counter of the secondary cell, and resetting the counter; and
  skipping sending beam failure recovery request information of the secondary cell to the network device.

In a possible implementation, the transceiver unit 802 is further configured to:
  receive second information from the network device, where the second information is used to indicate a first beam, and the first beam is used to receive, in the secondary cell, downlink information from the network device.

In a possible implementation, the transceiver unit 802 is specifically configured to:
  receive, in the primary cell, the second information from the network device; or
  receive, in a third cell, the second information from the network device, where the third cell is a secondary cell in which no beam failure occurs.

In a possible implementation, the first information is sent by using a first resource. The transceiver unit 802 is further configured to:
  if downlink information from the network device is successfully received in the secondary cell by using a first beam, determine that the first beam is a new available beam in the secondary cell, where the first beam is a beam associated with the first resource.

For example, when the apparatus 800 implements a function of the network device in the procedure shown in FIG. 2, the transceiver unit 802 is configured to receive first information from a terminal device, where the first information is used to indicate a beam failure of a secondary cell in a first cell and a second cell. The first cell is a primary cell and the second cell is the secondary cell, or the first cell is the secondary cell and the second cell is a primary cell. The first information is sent by the terminal device after the terminal device determines that the beam failure recovery of the primary cell in the first cell and the second cell succeeds.

The processing unit 801 is configured to perform beam recovery of the terminal device in the secondary cell based on the first information.

In a possible implementation, the transceiver unit 802 is further configured to:
  send second information to the terminal device, where the second information is used to indicate a first beam, and the first beam is used by the terminal device to receive downlink information in the secondary cell.

In a possible implementation, the transceiver unit 802 is specifically configured to:
  send the second information in the primary cell; or
  send the second information in a third cell, where the third cell is a secondary cell in which no beam failure occurs.

In a possible implementation, the first information is sent by using a first resource. The processing unit 801 is further configured to:
  determine the first beam associated with the first resource.

The transceiver unit 802 is further configured to send the downlink information to the terminal device in the secondary cell by using the first beam.

For example, when the apparatus 800 implements a function of the terminal device in the procedure shown in FIG. 6, the processing unit 801 is configured to: determine a beam failure of a first cell, suspend or terminate a beam failure recovery procedure of the first cell before beam failure recovery of the first cell succeeds and if a beam failure of a second cell is determined, and send third information to a network device, where the third information is used to indicate at least a beam failure of a primary cell in the first cell and the second cell. The first cell is the primary cell and the second cell is a secondary cell, or the first cell is a secondary cell and the second cell is the primary cell.

The transceiver unit 802 is configured to receive fourth information from the network device, where the fourth information is used to respond to the third information.

In a possible implementation, the third information is used to indicate the beam failure of the first cell and is used to indicate the beam failure of the second cell.

The transceiver unit 802 is specifically configured to:
  send the third information to the network device by using a second resource.

The second resource is a random access resource, a scheduling request resource, an uplink control resource, an uplink data resource, a media access control control element resource, or a dedicated beam recovery request resource.

In a possible implementation, the transceiver unit 802 is further configured to:
  receive fifth information from the network device, where the fifth information is used to indicate a second beam, and the second beam is used by the terminal device to receive, in the secondary cell, downlink information from the network device.

In a possible implementation, the transceiver unit 802 is specifically configured to:
  receive, in the primary cell, the fifth information from the network device; or
  receive, in a third cell, the fifth information from the network device, where the third cell is a secondary cell in which no beam failure occurs.

In a possible implementation, the third information is sent by using a second resource. The transceiver unit 802 is further configured to:
  if downlink information from the network device is successfully received in the secondary cell by using a second beam, determine that the second beam is a new available beam of the terminal device in the secondary cell, where the second beam is a beam associated with the second resource.

For example, when the apparatus 800 implements a function of the network device in the procedure shown in FIG. 6, the processing unit 801 is configured to receive third information from a terminal device by using the transceiver unit 802, where the third information is used to indicate at least a beam failure of a primary cell in a first cell and a second cell. The first cell is the primary cell and the second cell is a secondary cell, or the first cell is a secondary cell and the second cell is the primary cell. The third information is sent by the terminal device before beam failure recovery of the first cell succeeds and after a beam failure of the second cell is determined, or is sent by the terminal device before beam failure request information of the first cell is successfully sent and after a beam failure of the second cell is determined.

The processing unit 801 is configured to send fourth information to the terminal device by using the transceiver unit 802, where the fourth information is used to respond to the third information.

In a possible implementation, the transceiver unit 802 is further configured to:
  send fifth information to the terminal device, where the fifth information is used to indicate a second beam, and the second beam is used by the terminal device to receive, in the secondary cell, downlink information from the network device.

In a possible implementation, the processing unit 801 is specifically configured to: by using the transceiver unit 802,
  send the fifth information in the primary cell; or
  send the fifth information in a third cell, where the third cell is a secondary cell in which no beam failure occurs.

In a possible implementation, the third information is sent by using a second resource. The processing unit 801 is further configured to:
  determine a second beam associated with the second resource; and
  send downlink information to the terminal device in the secondary cell by using the second beam and the transceiver unit 802.

For example, when the apparatus 800 implements a function of the terminal device in the procedure shown in FIG. 7, the processing unit 801 is configured to determine a beam failure of a first cell, and before beam failure recovery of the first cell succeeds, if a beam failure of a second cell is determined, the transceiver unit 802 is configured to send sixth information to a network device, where the sixth information is used to indicate at least a beam failure of a primary cell in the first cell and the second cell. The first cell is the primary cell and the second cell is a secondary cell, or the first cell is a secondary cell and the second cell is the primary cell.

The transceiver unit 802 is configured to receive seventh information from the network device, where the seventh information is used to respond to the sixth information.

In a possible implementation, before the sixth information is sent to the network device, the processing unit 801 is further configured to suspend or terminate a beam failure recovery procedure of the secondary cell in the first cell and the second cell.

In a possible implementation, when the sixth information is used to indicate the beam failure of the primary cell, the transceiver unit 802 is specifically configured to: select a beam from a preset candidate beam set as a first beam; and send, by using the first beam, the sixth information to the network device in a random access resource associated with the first beam.

In a possible implementation, the transceiver unit 802 is further configured to send eighth information to the network device, where the eighth information is used to indicate a beam failure of the secondary cell.

In a possible implementation, the sixth information is used to indicate the beam failure of the first cell, and is used to indicate the beam failure of the second cell. The transceiver unit 802 is specifically configured to send the sixth information to the network device by using a third resource, where the third resource is a random access resource, a scheduling request resource, an uplink control resource, an uplink data resource, a media access control control element resource, or a dedicated beam recovery request resource.

In a possible implementation, the transceiver unit 802 is further configured to receive ninth information from the network device, where the ninth information is used to indicate a fifth beam, and the fifth beam is used by the terminal device to receive, in the secondary cell, downlink information from the network device.

In the foregoing method, the ninth information is obtained through the primary cell or the third cell, so that a latency of recovering a beam of the secondary cell can be reduced, and system efficiency can be improved.

In a possible implementation, the transceiver unit 802 is specifically configured to receive, in the primary cell, the ninth information from the network device; or receive, in the third cell, the ninth information from the network device, where the third cell is a secondary cell in which no beam failure occurs.

In a possible implementation, the sixth information is sent by using a fourth resource. The transceiver unit 802 is further configured to:
  if downlink information from the network device is successfully received in the secondary cell by using a fifth beam, determine that the fifth beam is a new available beam of the terminal device in the secondary cell, where the fifth beam is a beam associated with the fourth resource.

For example, when the apparatus 800 implements a function of the network device in the procedure shown in FIG. 7, the processing unit 801 is configured to receive sixth information from a terminal device by using the transceiver unit 802, where the sixth information is used to indicate at least a beam failure of a primary cell in a first cell and a second cell. The first cell is the primary cell and the second cell is a secondary cell, or the first cell is a secondary cell and the second cell is the primary cell. The sixth information is sent by the terminal device when a beam failure of the second cell is determined, after a beam failure of the first cell is determined, and before a beam of the first cell is recovered. The processing unit 801 is configured to send seventh information to the terminal device by using the transceiver unit 802, where the seventh information is used to respond to the sixth information.

In a possible implementation, the processing unit 801 is further configured to receive eighth information from the terminal device by using the transceiver unit 802, where the eighth information is used to indicate a beam failure of the secondary cell.

In a possible implementation, the sixth information is used to indicate the beam failure of the first cell, and is used to indicate the beam failure of the second cell. The transceiver unit 802 is specifically configured to receive the sixth information by using a third resource, where the third resource is a random access resource, a scheduling request resource, an uplink control resource, an uplink data resource, a media access control control element resource, or a dedicated beam recovery request resource.

In a possible implementation, the transceiver unit 802 is specifically configured to send ninth information to the terminal device, where the ninth information is used to indicate a fifth beam, and the fifth beam is used by the terminal device to receive, in the secondary cell, downlink information from the network device.

In a possible implementation, the transceiver unit 802 is specifically configured to send the ninth information in the primary cell; or send the ninth information in a third cell, where the third cell is a secondary cell in which no beam failure occurs.

In the foregoing method, the ninth information is obtained through the primary cell or the third cell, so that a latency of recovering a beam of the secondary cell can be reduced, and system efficiency can be improved.

In a possible implementation, the sixth information is sent by using a fourth resource. The transceiver unit 802 is further configured to: determine a fifth beam associated with the fourth resource, and send downlink information to the terminal device in the secondary cell by using the first beam.

Figure 9:
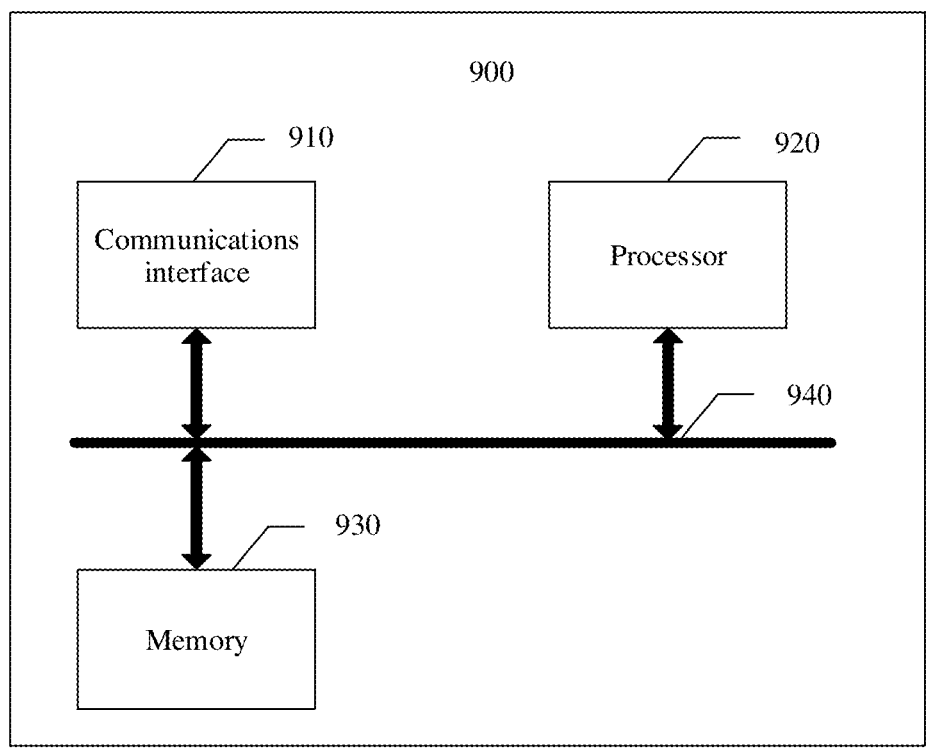
FIG. 9 is a schematic diagram of a structure of a communication apparatus according to an embodiment of this application.

FIG. 9 shows an apparatus 900 according to an embodiment of this application. The apparatus shown in FIG. 9 may be an implementation of a hardware circuit of the apparatus shown in FIG. 8. The communication apparatus is applicable to the flowcharts shown in FIG. 2 to FIG. 7, and performs functions of the terminal device or the network device in the foregoing method embodiments. For ease of description, FIG. 9 shows only main components of the communication apparatus.

The apparatus 900 shown in FIG. 9 includes at least one processor 920, configured to implement a function of the terminal device or the network device in the method provided in the embodiments of this application.

The apparatus 900 may further include at least one memory 930, configured to store program instructions and/or data. The memory 930 is coupled to the processor 920. The coupling in this embodiment of this application may be an indirect coupling or a communication connection between apparatuses, units, or modules in an electrical form, a mechanical form, or another form, and is used for information exchange between the apparatuses, the units, or the modules. The processor 920 may cooperate with the memory 930. The processor 920 may execute the program instructions stored in the memory 930. At least one of the at least one memory 930 may be included in the processor 920, or disposed independently of the processor 920.

The apparatus 900 may further include a communication interface 910, configured to communicate with another device through a transmission medium, so that an apparatus in the communication apparatus 900 can communicate with the another device. For example, the communication interface 910 may be a transceiver, a circuit, a bus, a module, or a communication interface of another type. The processor 920 sends and receives data by using the communication interface 910, and is configured to implement the method performed by the terminal device or the network device in the embodiments corresponding to FIG. 2 to FIG. 7.

A specific connection medium between the communication interface 910, the processor 920, and the memory 930 is not limited in this embodiment of this application. In this embodiment of this application, the memory 930, the processor 920, and the communication interface 910 are connected by using a bus 940 in FIG. 9, and the bus is represented by a bold line in FIG. 9. A connection manner between other components is schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

For example, when the apparatus 900 implements a function of the terminal device in the procedure shown in FIG. 2, the processor 920 is configured to: determine a beam failure of a first cell, and suspend or terminate a beam failure recovery procedure of a secondary cell in the first cell and a second cell before beam failure recovery of the first cell succeeds and if a beam failure of a second cell is determined, where the first cell is a primary cell and the second cell is the secondary cell, or the first cell is the secondary cell and the second cell is a primary cell.

The communication interface 910 is configured to: after determining that beam failure recovery of the primary cell in the first cell and the second cell succeeds, send first information to a network device, where the first information is used to indicate a beam failure of the secondary cell in the first cell and the second cell.

In a possible implementation, the suspending or terminating a beam failure recovery procedure of a secondary cell in the first cell and the second cell includes one or more of the following:

suspending or terminating a beam failure detection timer of the secondary cell, and resetting the timer;

suspending or terminating a beam failure detection counter of the secondary cell, and resetting the counter; and skipping sending beam failure recovery request information of the secondary cell to the network device.

In a possible implementation, the communication interface 910 is further configured to:

receive second information from the network device, where the second information is used to indicate a first beam, and the first beam is used to receive, in the secondary cell, downlink information from the network device.

In a possible implementation, the communication interface 910 is specifically configured to:

receive, in the primary cell, the second information from the network device; or receive, in a third cell, the second information from the network device, where the third cell is a secondary cell in which no beam failure occurs.

In a possible implementation, the first information is sent by using a first resource. The communication interface 910 is further configured to:

if downlink information from the network device is successfully received in the secondary cell by using a first beam, determine that the first beam is a new available beam in the secondary cell, where the first beam is a beam associated with the first resource.

For example, when the apparatus 900 implements a function of the network device in the procedure shown in FIG. 2, the communication interface 910 is configured to receive first information from a terminal device, where the first information is used to indicate a beam failure of a secondary cell in a first cell and a second cell. The first cell is a primary cell and the second cell is the secondary cell, or the first cell is the secondary cell and the second cell is a primary cell. The first information is sent by the terminal device after the terminal device determines that the beam failure recovery of the primary cell in the first cell and the second cell succeeds.

The processor 920 is configured to perform beam recovery of the terminal device in the secondary cell based on the first information.

In a possible implementation, the communication interface 910 is further configured to:
send second information to the terminal device, where the second information is used to indicate a first beam, and the first beam is used by the terminal device to receive downlink information in the secondary cell.

In a possible implementation, the communication interface 910 is specifically configured to:
send the second information in the primary cell; or
send the second information in a third cell, where the third cell is a secondary cell in which no beam failure occurs.

In a possible implementation, the first information is sent by using a first resource. The processor 920 is further configured to:
determine the first beam associated with the first resource.

The communication interface 910 is further configured to send the downlink information to the terminal device in the secondary cell by using the first beam.

For example, when the apparatus 900 implements a function of the terminal device in the procedure shown in FIG. 6, the processor 920 is configured to: determine a beam failure of a first cell, suspend or terminate a beam failure recovery procedure of the first cell before beam failure recovery of the first cell succeeds and if a beam failure of a second cell is determined, and send third information to a network device, where the third information is used to indicate at least a beam failure of a primary cell in the first cell and the second cell. The first cell is the primary cell and the second cell is a secondary cell, or the first cell is a secondary cell and the second cell is the primary cell.

The communication interface 910 is configured to receive fourth information from the network device, where the fourth information is used to respond to the third information.

In a possible implementation, the third information is used to indicate the beam failure of the first cell and is used to indicate the beam failure of the second cell.

The communication interface 910 is specifically configured to:
send the third information to the network device by using a second resource.

The second resource is a random access resource, a scheduling request resource, an uplink control resource, an uplink data resource, a media access control control element resource, or a dedicated beam recovery request resource.

In a possible implementation, the communication interface 910 is further configured to:
receive fifth information from the network device, where the fifth information is used to indicate a second beam, and the second beam is used to receive, in the secondary cell, downlink information from the network device.

In a possible implementation, the communication interface 910 is specifically configured to:
receive, in the primary cell, the fifth information from the network device; or
receive, in a third cell, the fifth information from the network device, where the third cell is a secondary cell in which no beam failure occurs.

In a possible implementation, the third information is sent by using a second resource. The communication interface 910 is further configured to:
if downlink information from the network device is successfully received in the secondary cell by using a second beam, determine that the second beam is a new available beam in the secondary cell, where the second beam is a beam associated with the second resource.

For example, when the apparatus 900 implements a function of the network device in the procedure shown in FIG. 6, the processor 920 is configured to receive third information from a terminal device by using the communication interface 910, where the third information is used to indicate at least a beam failure of a primary cell in a first cell and a second cell. The first cell is the primary cell and the second cell is a secondary cell, or the first cell is a secondary cell and the second cell is the primary cell. The third information is sent by the terminal device before beam failure recovery of the first cell succeeds and after a beam failure of the second cell is determined, or is sent by the terminal device before beam failure request information of the first cell is successfully sent and after a beam failure of the second cell is determined.

The processor 920 is configured to send fourth information to the terminal device by using the communication interface 910, where the fourth information is used to respond to the third information.

In a possible implementation, the communication interface 910 is further configured to:
send fifth information to the terminal device, where the fifth information is used to indicate a second beam, and the second beam is used by the terminal device to receive downlink information in the secondary cell.

In a possible implementation, the processor 920 is specifically configured to: by using the communication interface 910,
send the fifth information in the primary cell; or
send the fifth information in a third cell, where the third cell is a secondary cell in which no beam failure occurs.

In a possible implementation, the third information is sent by using a second resource. The processor 920 is further configured to:
determine a second beam associated with the second resource; and
send downlink information to the terminal device in the secondary cell by using the second beam and the communication interface 910.

For example, when the apparatus 900 implements a function of the terminal device in the procedure shown in FIG. 7, the processor 920 is configured to determine a beam failure of a first cell, and before beam failure recovery of the first cell succeeds, if a beam failure of a second cell is determined, the communication interface 910 is configured to send sixth information to a network device, where the sixth information is used to indicate at least a beam failure of a primary cell in the first cell and the second cell. The first cell is the primary cell and the second cell is a secondary cell, or the first cell is a secondary cell and the second cell is the primary cell.

The communication interface 910 is configured to receive seventh information from the network device, where the seventh information is used to respond to the sixth information.

For example, the apparatus 900 may further implement another function of the terminal device. For details, refer to descriptions in the method procedure shown in FIG. 7. Details are not described herein again.

For example, when the apparatus 900 implements a function of the network device in the procedure shown in FIG. 7, the processor 920 is configured to receive sixth information from a terminal device by using the communication interface 910, where the sixth information is used to indicate at least a beam failure of a primary cell in a first cell and a second cell. The first cell is the primary cell and the second cell is a secondary cell, or the first cell is a secondary cell and the second cell is the primary cell. The sixth information is sent by the terminal device when a beam failure of the second cell is determined, after a beam failure of the first cell is determined, and before a beam of the first cell is recovered.

The processor 920 is configured to send seventh information to the terminal device by using the communication interface 910, where the seventh information is used to respond to the sixth information.

For example, the apparatus 900 may further implement another function of the network device. For details, refer to descriptions in the method procedure shown in FIG. 7. Details are not described herein again.

In this embodiment of this application, the processor may be a general purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware and a software module in the processor.

It should be understood that, a memory in this embodiment of this application may be a non-volatile memory, such as a hard disk drive (hard disk drive, HDD) or a solid-state drive (solid-state drive, SSD), or may be a volatile memory (volatile memory), such as a random access memory (random access memory, RAM). The memory is any other medium that can be used to carry or store expected program code in a form of instructions or a data structure and that can be accessed by a computer, but this is not limited thereto. The memory in this embodiment of this application may alternatively be a circuit or any other apparatus that can implement a storage function, and is configured to store program instructions and/or data.

An embodiment of this application further provides a computer-readable storage medium, including instructions. When the instructions are run on a computer, the computer is enabled to perform the method in the embodiments of this application.

An embodiment of this application further provides a computer program product, including instructions. When the computer program product runs on a computer, the computer is enabled to perform the method in the embodiments of this application.

An embodiment of this application provides a chip system. The chip system includes a processor, and may further include a memory, to implement the method in the embodiments of this application. The chip system may include a chip, or may include a chip and another discrete component.

An embodiment of this application provides a communication system. The communication system includes the foregoing network device and the foregoing terminal device.

All or some of the methods provided in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium (for example, an SSD), or the like.

Although some embodiments of the present invention have been described, a person skilled in the art can make changes and modifications to these embodiments once the person learns the basic inventive concept. Therefore, the following claims are intended to be construed as to cover the preferred embodiments and all changes and modifications falling within the scope of the present application.

It is clear that, a person skilled in the art can make various modifications and variations to this application without departing from the scope of this application. This application is intended to cover these modifications and variations of this application provided that they fall within the scope of the following claims and their equivalent technologies.

What is claimed is:

1. A beam failure processing method, comprising:
determining a beam failure of a first cell, wherein a beam failure recovery procedure of a primary cell in the first cell and a second cell is performed before beam failure recovery of the first cell succeeds and in response to a beam failure of the second cell being determined, and wherein the first cell is the primary cell and the second cell is a secondary cell, or the first cell is the secondary cell and the second cell is the primary cell; and
sending information to a network device, wherein the information is used to indicate at least a beam failure of the primary cell in the first cell and the second cell.

2. The method according to claim 1, wherein the method comprises suspending or terminating a beam failure recovery procedure of the secondary cell in the first cell and the second cell.

3. The method according to claim 2, wherein the suspending or terminating the beam failure recovery procedure of the secondary cell in the first cell and the second cell comprises one or more of the following:
suspending or terminating a beam failure detection timer of the secondary cell, and resetting the timer;
suspending or terminating a beam failure detection counter of the secondary cell, and resetting the counter; and
skipping sending beam failure recovery request information of the secondary cell to the network device.

4. The method according to claim 1, wherein the information sent to the network device used to indicate at least the beam failure of the primary cell in the first cell and the second cell is third information, and the method further comprises:

after determining that beam failure recovery of the primary cell in the first cell and the second cell succeeds, sending first information to the network device, wherein the first information is used to indicate a beam failure of the secondary cell in the first cell and the second cell; and receiving second information from the network device, wherein the second information is used to indicate a first beam, and the first beam is used to receive, in the secondary cell, downlink information from the network device.

5. The method according to claim 4, wherein the secondary cell in the first cell and the second cell is a first secondary cell, and the receiving of the second information from the network device comprises:

receiving, in the primary cell, the second information from the network device; or receiving, in a third cell, the second information from the network device, wherein the third cell is a second secondary cell in which no beam failure occurs.

6. The method according to claim 4, wherein the first information is sent by using a first resource, and the method further comprises:

determining that the first beam is a new available beam in the secondary cell, wherein the first beam is associated with the first resource.

7. A beam failure processing apparatus, comprising:

at least one processor; and one or more memories coupled to the at least one processor, the one or more memories having programming instructions stored thereon that, when executed by the at least one processor, cause the apparatus to:

determine a beam failure of a first cell, wherein a beam failure recovery procedure of a primary cell in the first cell and a second cell is performed before beam failure recovery of the first cell succeeds and in response to a beam failure of the second cell being determined, and wherein the first cell is the primary cell and the second cell is a secondary cell, or the first cell is the secondary cell and the second cell is the primary cell; and send information to a network device, wherein the information is used to indicate at least a beam failure of the primary cell in the first cell and the second cell.

8. The apparatus according to claim 7, wherein the apparatus is further caused to:

suspend or terminate a beam failure recovery procedure of the secondary cell in the first cell and the second cell.

9. The apparatus according to claim 8, wherein to suspend or terminate the beam failure recovery procedure of the secondary cell in the first cell and the second cell, the apparatus is caused to one or more of:

suspend or terminate a beam failure detection timer of the secondary cell, and reset the timer;

suspend or terminate a beam failure detection counter of the secondary cell, and reset the counter; and skip sending beam failure recovery request information of the secondary cell to the network device.

10. The apparatus according to claim 7, wherein the information sent to the network device used to indicate at least the beam failure of the primary cell in the first cell and the second cell is third information, and the apparatus is further caused to:

after determining that beam failure recovery of the primary cell in the first cell and the second cell succeeds, send first information to the network device, wherein the first information is used to indicate a beam failure of the secondary cell in the first cell and the second cell; and receive second information from the network device, wherein the second information is used to indicate a first beam, and the first beam is used to receive, in the secondary cell, downlink information from the network device.

11. The apparatus according to claim 10, wherein the secondary cell in the first cell and the second cell is a first secondary cell, and the apparatus is caused to receive the second information from the network device by:

receiving, in the primary cell, the second information from the network device; or receiving, in a third cell, the second information from the network device, wherein the third cell is a second secondary cell in which no beam failure occurs.

12. The apparatus according to claim 10, wherein the first information is sent by using a first resource, and the apparatus is further caused to:

determine that the first beam is a new available beam in the secondary cell, wherein the first beam is associated with the first resource.

13. A non-transitory computer-readable storage medium having instructions stored thereon that, when executed by a processor, causes an apparatus to:

determine a beam failure of a first cell, wherein a beam failure recovery procedure of a primary cell in the first cell and a second cell is performed before beam failure recovery of the first cell succeeds and in response to a beam failure of the second cell being determined, and wherein the first cell is the primary cell and the second cell is a secondary cell, or the first cell is the secondary cell and the second cell is the primary cell; and send information to a network device, wherein the information is used to indicate at least a beam failure of the primary cell in the first cell and the second cell.

14. The non-transitory computer-readable storage medium according to claim 13, wherein the apparatus is further caused to:

suspend or terminate a beam failure recovery procedure of the secondary cell in the first cell and the second cell.

15. The non-transitory computer-readable storage medium according to claim 14, wherein to suspend or terminate the beam failure recovery procedure of the secondary cell in the first cell and the second cell, the apparatus is caused to one or more of:

suspend or terminate a beam failure detection timer of the secondary cell, and reset the timer;

suspend or terminate a beam failure detection counter of the secondary cell, and reset the counter; and skip sending beam failure recovery request information of the secondary cell to the network device.

16. The non-transitory computer-readable storage medium according to claim 13, wherein the information sent to the network device used to indicate at least the beam failure of the primary cell in the first cell and the second cell is third information, and the apparatus is further caused to:

after determining that beam failure recovery of the primary cell in the first cell and the second cell succeeds, send first information to the network device, wherein the first information is used to indicate a beam failure of the secondary cell in the first cell and the second cell; and receive second information from the network device, wherein the second information is used to indicate a first beam, and the first beam is used to receive, in the secondary cell, downlink information from the network device.

17. The non-transitory computer-readable storage medium according to claim 16, wherein the secondary cell in the first cell and the second cell is a first secondary cell, and the apparatus is caused to receive the second information from the network device by:
- receiving, in the primary cell, the second information from the network device; or
- receiving, in a third cell, the second information from the network device, wherein the third cell is second secondary cell in which no beam failure occurs.

18. The non-transitory computer-readable storage medium according to claim 16, wherein the first information is sent by using a first resource, and the apparatus is further caused to:
- determine that the first beam is a new available beam in the secondary cell, wherein the first beam is associated with the first resource.

* * * * *